US008840186B2

(12) United States Patent
Samain

(10) Patent No.: US 8,840,186 B2
(45) Date of Patent: *Sep. 23, 2014

(54) SUPPORT ASSEMBLY AND CORRESPONDING SEAT STRUCTURE

(75) Inventor: Maxime Samain, Lauwe (BE)

(73) Assignee: L&P Swiss Holding AG, Wittenbach (DE)

( * ) Notice: Subject to any disclaimer, the term of this patent is extended or adjusted under 35 U.S.C. 154(b) by 796 days.

This patent is subject to a terminal disclaimer.

(21) Appl. No.: 12/741,815

(22) PCT Filed: Jan. 21, 2008

(86) PCT No.: PCT/EP2008/000429
§ 371 (c)(1),
(2), (4) Date: Jun. 15, 2010

(87) PCT Pub. No.: WO2009/059648
PCT Pub. Date: May 14, 2009

(65) Prior Publication Data
US 2010/0268133 A1 Oct. 21, 2010

Related U.S. Application Data

(63) Continuation-in-part of application No. 11/936,498, filed on Nov. 7, 2007, now Pat. No. 7,841,662.

(51) Int. Cl.
A47C 7/14 (2006.01)
A47C 7/46 (2006.01)
A47C 3/00 (2006.01)
F16C 1/22 (2006.01)
B60N 2/66 (2006.01)
F16C 1/10 (2006.01)
B60N 2/02 (2006.01)

(52) U.S. Cl.
CPC ... F16C 1/22 (2013.01); B60N 2/66 (2013.01); F16C 1/101 (2013.01); B60N 2/0232 (2013.01); B60N 2002/0236 (2013.01)
USPC .................. 297/284.3; 297/284.1; 297/284.8; 601/100

(58) Field of Classification Search
CPC .......... A47C 7/46; A47C 7/462; A47C 7/465; A47C 7/14; A47C 3/025; B60N 2/66
USPC .................. 601/84, 89, 90, 91, 92, 97, 98, 46; 297/284.1, 284.7, 284.4, 284.3, 284.8
See application file for complete search history.

(56) References Cited

U.S. PATENT DOCUMENTS 4,368,793 A 1/1983 Igarashi
5,016,490 A 5/1991 Jaksic
(Continued)

FOREIGN PATENT DOCUMENTS

DE 19609255 8/1997
DE 10114521 9/2002
(Continued)

OTHER PUBLICATIONS

PCT International Search Report and Written Opinion, International Patent Application No. PCT/EP2008/000429, dated Aug. 28, 2008.

*Primary Examiner* — Justine Yu
*Assistant Examiner* — Christopher Miller
(74) *Attorney, Agent, or Firm* — Michael Best & Friedrich LLP

(57) ABSTRACT

A support assembly having a first support region with adjustable degree of support and a second support region with adjustable degree of support includes a support member for incorporation into a seat frame, a first adjustment arrangement for adjusting the degree of support in the first support region, and a second adjustment arrangement for adjusting the degree of support in the second support region. An actuator is coupled to the first adjustment arrangement and to the second adjustment arrangement. The actuator is configured to simultaneously act on the first and second adjustment arrangements in opposite directions. A wire-length control mechanism is coupled to one of the first adjustment arrangement and the second adjustment arrangement and is configured to absorb an excessive length of a wire of the one of the first adjustment arrangement and the second adjustment arrangement.

34 Claims, 30 Drawing Sheets

(56) References Cited

U.S. PATENT DOCUMENTS

| | | | |
|---|---|---|---|
| 5,211,071 A * | 5/1993 | Hedstrom | 74/501.5 R |
| 5,346,285 A * | 9/1994 | West, III | 297/452.18 |
| 5,498,063 A * | 3/1996 | Schuster et al. | 297/284.1 |
| 5,555,769 A | 9/1996 | Lichtenberg | |
| 5,816,653 A * | 10/1998 | Benson | 297/284.4 |
| 5,823,620 A * | 10/1998 | Le Caz | 297/284.4 |
| 6,050,641 A * | 4/2000 | Benson | 297/284.4 |
| 6,152,531 A * | 11/2000 | Deceuninck | 297/284.4 |
| 6,338,530 B1 * | 1/2002 | Gowing | 297/284.4 |
| 6,601,919 B1 * | 8/2003 | Deceuninck | 297/284.4 |
| 6,692,074 B1 * | 2/2004 | Kopetzky et al. | 297/284.8 |
| 6,814,407 B2 | 11/2004 | Mundell | |
| 6,880,886 B2 | 4/2005 | Bodnar et al. | |
| 6,905,170 B2 * | 6/2005 | McMillen et al. | 297/284.4 |
| 6,971,719 B2 | 12/2005 | Liu et al. | |
| 7,083,233 B2 | 8/2006 | Massara et al. | |
| 7,131,694 B1 * | 11/2006 | Buffa | 297/284.4 |
| 7,469,617 B2 * | 12/2008 | Basile et al. | 74/501.5 R |
| 7,841,662 B2 * | 11/2010 | Samain | 297/284.4 |
| 8,136,882 B2 * | 3/2012 | Kopetzky et al. | 297/284.4 |
| 2001/0043002 A1 * | 11/2001 | Nakane et al. | 297/284.1 |
| 2002/0113472 A1 * | 8/2002 | Blendea et al. | 297/284.4 |
| 2003/0075959 A1 * | 4/2003 | Xue et al. | 297/284.4 |
| 2003/0227203 A1 * | 12/2003 | Mundell | 297/284.4 |
| 2004/0245824 A1 | 12/2004 | McMillen | |
| 2005/0200178 A1 * | 9/2005 | Samain et al. | 297/284.4 |
| 2006/0226683 A1 | 10/2006 | Massara et al. | |
| 2009/0115234 A1 | 5/2009 | Samain | |

FOREIGN PATENT DOCUMENTS

| | | |
|---|---|---|
| EP | 0552904 | 7/1993 |
| EP | 0874575 | 11/1998 |
| EP | 1406023 | 4/2004 |
| EP | 1762155 | 3/2007 |
| GB | 2342286 | 4/2000 |
| JP | 2006063753 | 3/2006 |
| WO | 9400039 | 1/1994 |
| WO | 97/24960 | 7/1997 |
| WO | 03/034871 | 5/2003 |

* cited by examiner

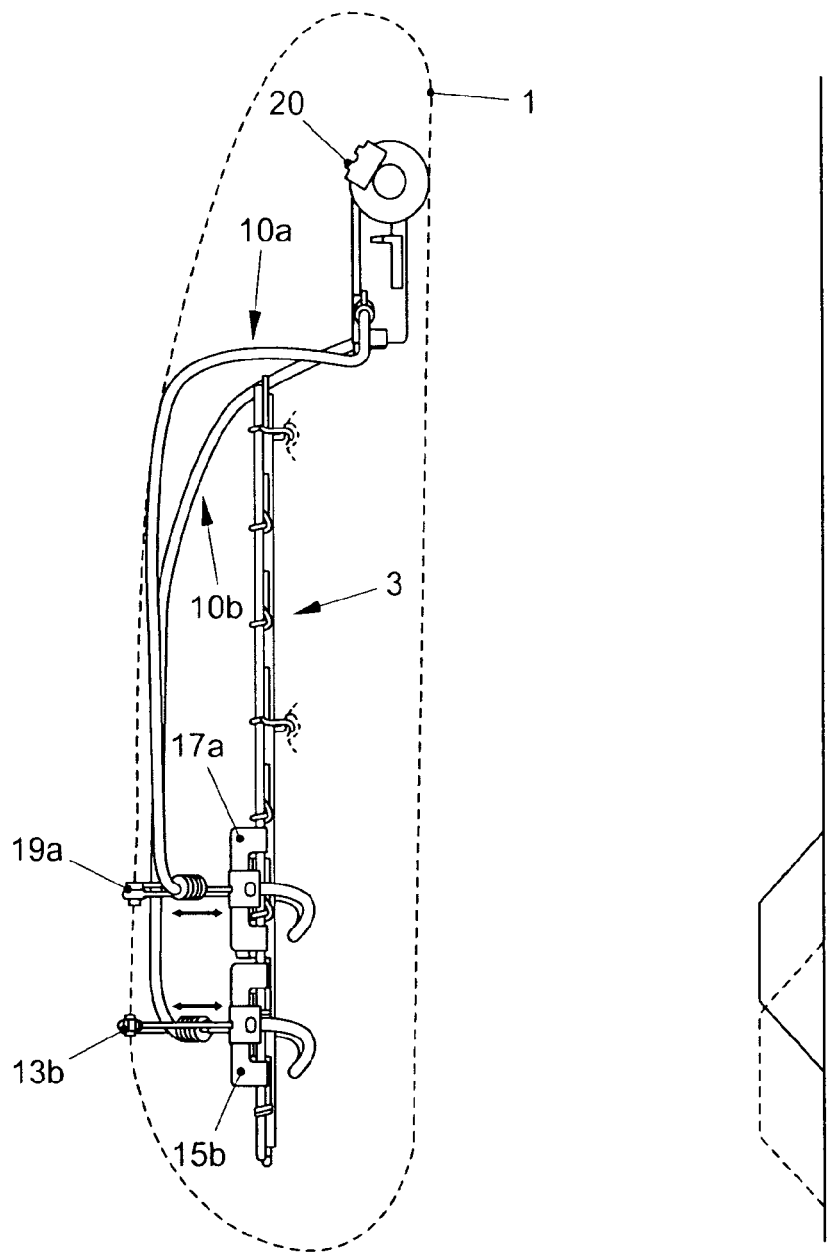
FIG. 2a
FIG. 2b
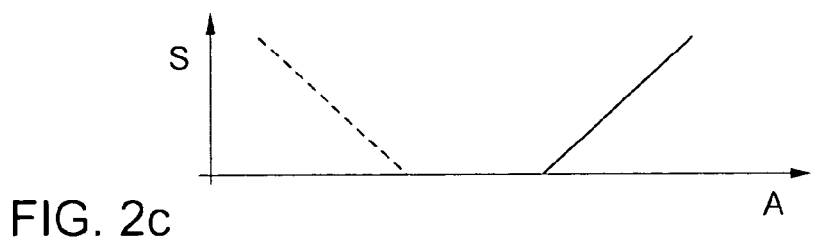
FIG. 2c

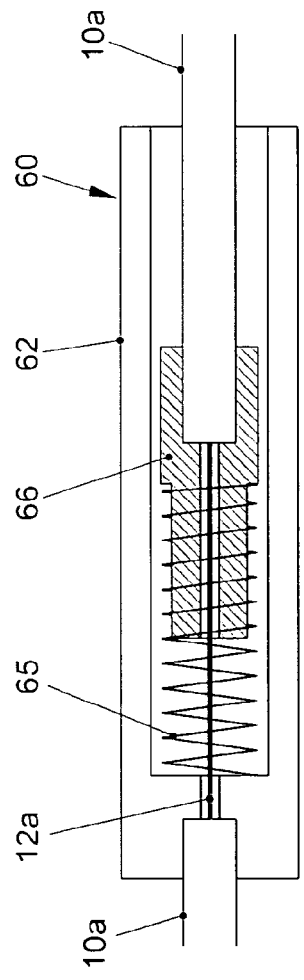
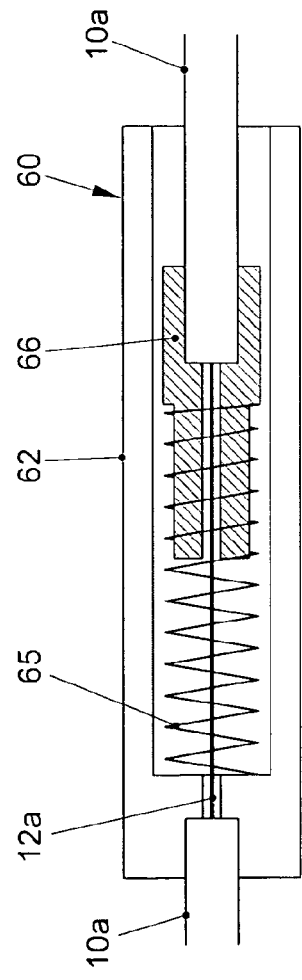
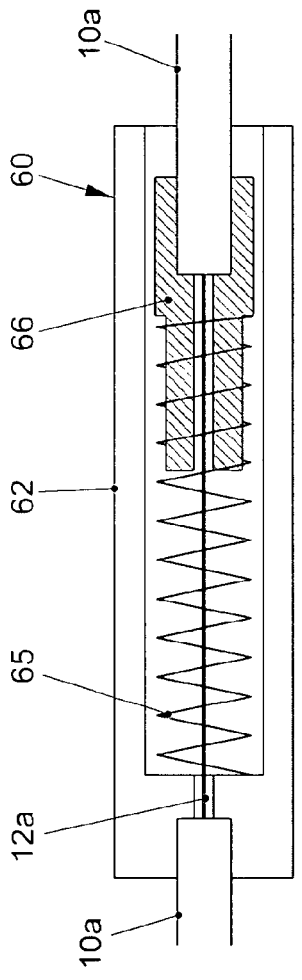
FIG. 10A
FIG. 10B
FIG. 10C

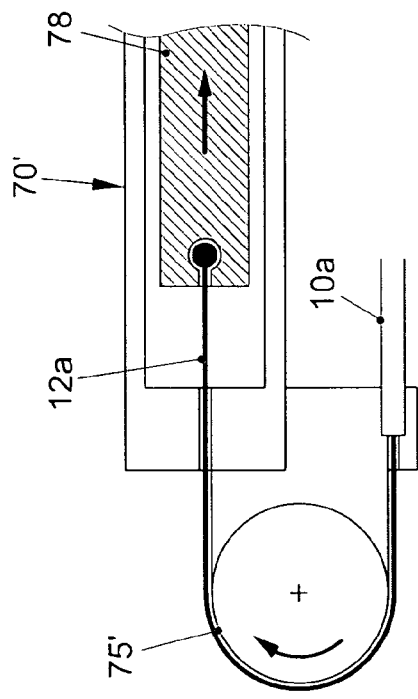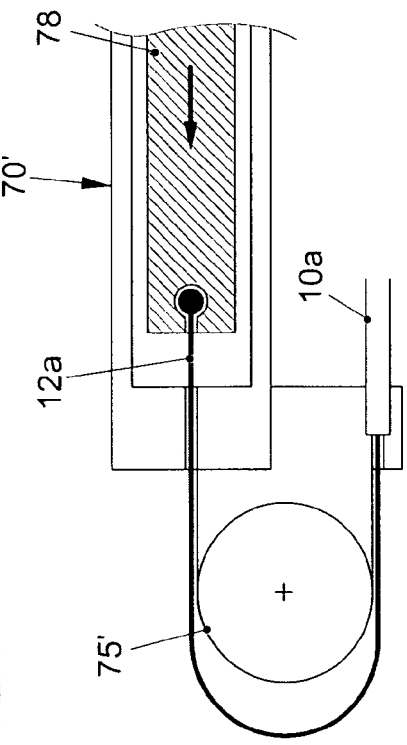

| Step | Lumbar | Translated actuator positions | |
|---|---|---|---|
| | | A1 | A2 |
| 1 | Go to neutral position | 50% | 50% |
| 2 | Activate Zone 1 | 0% | 50% |
| 3 | Deactivate Zone 1 | 50% | 50% |
| 4 | Activate Zone 2 | 50% | 0% |
| 5 | Deactivate Zone 2 | 50% | 50% |
| 6 | Activate Zone 3 | 100% | 50% |
| 7 | Deactivate Zone 3 | 50% | 50% |
| 8 | Activate Zone 4 | 50% | 100% |
| 9 | Deactivate Zone 4 | 50% | 50% |
| 10 | Repeat 10 times step 2 until step 9 | | |
| 11 | Go back to original position | Go back to original position | |

| Step | Lumbar | Translated actuator positions | |
|---|---|---|---|
| | | A1 | A2 |
| 1 | Go to neutral position | 50% | 50% |
| 2 | Activate Zone 4 | 50% | 100% |
| 3 | Activate Zone 3 | 100% | 100% |
| 4 | Deactivate Zone 4 | 100% | 50% |
| 5 | Activate Zone 2 | 100% | 0% |
| 6 | Deactivate Zone 3 | 50% | 0% |
| 7 | Activate Zone 1 | 0% | 0% |
| 8 | Deactivate Zone 2 | 0% | 50% |
| 9 | Activate Zone 4 | 0% | 100% |
| 10 | Deactivate Zone 1 | 50% | 100% |
| 11 | Repeat 10 times step 3 until step 6 | | |
| 12 | Go back to original position | Go back to original position | |

| Step | Lumbar | Translated actuator positions | |
|---|---|---|---|
| | | A1 | A2 |
| 1 | Go to neutral position | 50% | 50% |
| 2 | Activate Zone 1 | 0% | 50% |
| 3 | Activate Zone 2 | 0% | 0% |
| 4 | Deactivate Zone 1 | 50% | 0% |
| 5 | Activate Zone 3 | 100% | 0% |
| 6 | Deactivate Zone 2 | 100% | 50% |
| 7 | Activate Zone 4 | 100% | 100% |
| 8 | Deactivate Zone 3 | 50% | 100% |
| 9 | Activate Zone 1 | 0% | 100% |
| 10 | Deactivate 4 | 0% | 50% |
| 11 | Repeat 10 times step 3 until step 10 | | |
| 12 | Go back to original position | Go back to original position | |

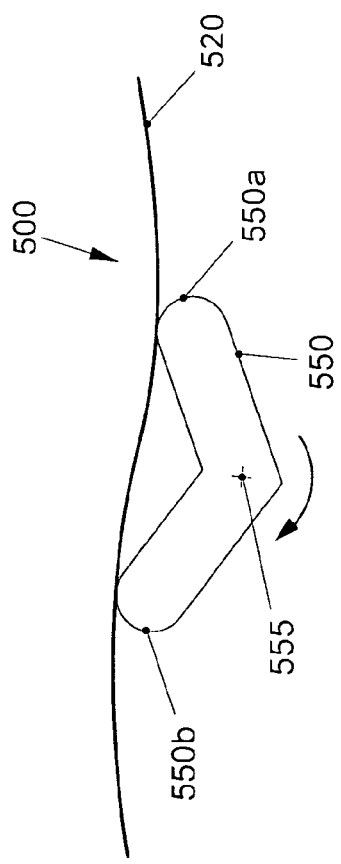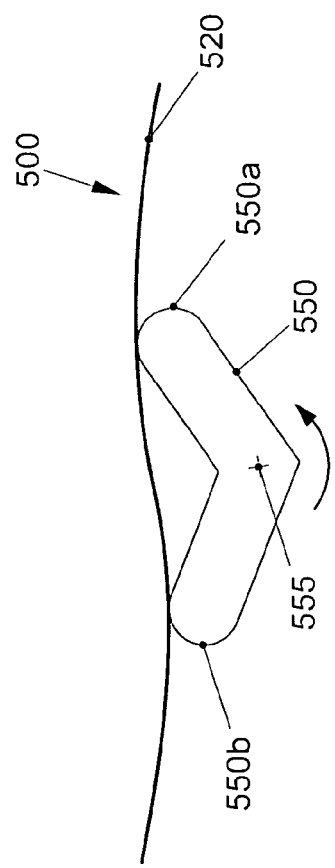

SUPPORT ASSEMBLY AND CORRESPONDING SEAT STRUCTURE

This application is a U.S. national phase application filing of International Patent Application No. PCT/EP2008/000429, filed Jan. 21, 2008, which is a continuation-in-part of U.S. patent application Ser. No. 11/936,498, filed Nov. 7, 2007, the entire contents of which are incorporated herein by reference.

BACKGROUND

The present invention relates to a support assembly, and in particular to a support assembly for incorporation into a seat frame in order to provide a seat structure with an adjustable degree of support in two different regions, e.g. a lumbar region and a pelvis region. More specifically, the present invention relates to a support assembly comprising a support member for providing load bearing support for upholstery of a seat.

Support assemblies of the aforementioned kind are very well known and may have various configurations determined by the design of a seat in which the support assembly is to be mounted (see, e.g., WO 95/00039 A).

EP 0 874 575 B1 proposes a support assembly for incorporation into a seat frame, the support assembly comprises a wire framework having two lateral side wires suspendable in the seat frame and a plurality of transverse wires providing load bearing support for upholstery of the respective seat and extending between the lateral side wires.

Support assemblies of the aforementioned kind are incorporated in a seat frame of a back rest in order to support the lumbar region of a person sitting on the respective seat. When using a support assembly having a wire framework of the kind described above, this can be accomplished by pulling the two lateral side wires of the wire framework towards the front of the back rest of the seat. For example, EP 0 552 904 A1 discloses such a lumbar support assembly comprising a support member in the form of a platform element, which is suspended by tension springs in a seat frame to support the cushioning of a back rest. The support member has two lateral side wires and a plurality of transverse wires, and two adjustment arrangements comprising Bowden cables are linked between respective portions of the lateral side wires to apply a force of longitudinal compression, whereby the side wires are caused to be hinged outwardly at an articulation point to vary the degree of lumbar support provided by the transverse wires.

Since the two sides of the support member of the support assembly should be displaced by the same amount at the same time for achieving a symmetric support feeling, it is necessary to shorten the extension of both Bowden cables by a respective actuator mechanism simultaneously, which however is difficult to achieve and requires two separate Bowden cables.

Further, it is known to provide lumbar support assemblies not only with an adjustable degree of support, but also with an adjustable height, which means that a vertical position of the region in which the support is provided can be adjusted. For this purpose, it is typically required to have one mechanism for adjusting the degree of support and a further mechanism for adjusting the height. Moreover, it is necessary to have two separate actuators for independently adjusting the height and the degree of support.

From GB 2 342 286 A, a support assembly is known which comprises a support member to be suspended in a seat frame and adjustable link means for varying the effective profile of the support. In particular, a plurality of the adjustable link means is provided which are spaced apart in a vertical direction of the seat frame, which allows for adjusting the degree of support in vertically different regions of the support member. Also in this case, two separate adjustment arrangements or adjustment mechanisms comprising Bowden cables and an actuator are required for each of the different support regions.

In the above-known support assemblies, there exists therefore a problem as to a large number of components which have to be used for achieving a symmetric adjustable support in different regions. This increases costs of the seat, and may also result in problems as to accommodating the various components within the seat structure.

In this respect, EP 05 019 763 proposes a support assembly in which a first Bowden cable arrangement for adjusting the degree of support in a first support region and a second Bowden cable arrangement for adjusting the degree of support in a second support region are actuated by a single actuator configured to simultaneously act, in opposite directions, on the first Bowden cable arrangement and on the second Bowden cable arrangement.

SUMMARY

It is an object of the present invention to improve the support assemblies of the above-mentioned type.

This object is achieved by a support assembly according to claim 1, by a support assembly according to claim 24, and by a support assembly according to claim 30. The dependent claims define preferred and advantageous embodiments of the invention.

According to a first aspect of the invention, the support assembly comprises a support member for incorporation into a seat frame. The support member may be a wire framework having as side members two lateral side wires and a plurality of transverse wires as transverse members which extend between the two side members. The support member is preferably adapted to be suspended in a seat frame.

Furthermore, the support assembly has a first support region with an adjustable degree of support and a second support region with an adjustable degree of support. The first support region and the second support region are preferably located at different heights of the support assembly, for example in the lumbar region and in the pelvis region or in a lumbar region of a large person and in the lumbar region of a small person.

The support assembly comprises a first Bowden cable arrangement for adjusting the degree of support in the first support region and a second Bowden cable arrangement for adjusting the degree of support in the second support region. The first Bowden cable arrangement and the second Bowden cable arrangement each comprise a wire being movably or slidably guided within a sheath. According to the invention, an actuator is coupled to the first Bowden cable arrangement and to the second Bowden cable arrangement and is configured to simultaneously act on the first adjustment arrangement and on the second adjustment arrangement in opposite directions, i.e. to increase the tension in one of the adjustment arrangements while decreasing the tension in the other adjustment arrangement and vice versa.

Further, the support assembly further comprises a wire-length control mechanism coupled to the first and/or second Bowden cable arrangement, for absorbing an excessive length of the Bowden cable wire when there is low or even no tension on the Bowden cable arrangement. The wire-length control mechanism may be implemented within the actuator or may be a separate component.

According to the above structure of the support assembly according to the first aspect of the present invention, it is possible to increase the degree of support in the first support region by operating the actuator in a first direction and to simultaneously decrease the degree of support in the second support region. Conversely, by operating the actuator in a second direction, it is possible to decrease the degree of support in the first support region and to increase the degree of support in the second support region. Thereby, it is possible to select between different positions for the support, and to adjust the degree of support in each of the different regions. Still, there is only one actuator required to achieve these different possibilities of adjustment. Consequently, a simple structure is provided for the support assembly and the support assembly can be realized at low cost. Further, due to the wire-length control mechanism problems due to a lack of tension on one of the Bowden cable arrangements are avoided. In particular, uncontrolled movement of the wire is avoided in a situation when there is low or even no tension on the respective Bowden cable arrangement.

Preferably, the support assembly according to the above aspects of the invention comprises first attachment means for attaching a sheath of the first Bowden cable arrangement to one side of the support member in the first support region, second attachment means for attaching the sheath of the first Bowden cable arrangement to the opposite side of the support member in the first support region, third attachment means for attaching a sheath of the second Bowden cable arrangement to one side of the support member in the second support region, and fourth attachment means for attaching the sheath of the second Bowden cable arrangement to the opposite side of the support member in the second support region, a first end portion of the wire of the first Bowden cable arrangement extending from the first attachment means and being adapted to be connected to the seat frame, and a first end portion of the wire of the second Bowden cable arrangement extending from the third attachment means and being adapted to be connected to the seat frame. With this structure, when the support assembly is suspended in a seat frame, the degree of support can be adjusted in each of the support regions and by moving the support member with respect to the seat frame due to an increased or decreased length of the wire extending from the attachment means.

The first attachment means and the fourth attachment means can be located on the same side of the support member. In this case, also the second attachment means and the third attachment means are located on the same side of the support member, opposite to the first attachment means and the fourth attachment means. Alternatively, it could also be possible to locate the first attachment means and the third attachment means on the same side of the support member, which means that also the second attachment means and the fourth attachment means would be located on the same side of the support member, but opposite to the first and third attachment means. By means of these different locations for the attachment means, the support assembly can be easily adapted to different locations for accommodating the actuator. Those of the attachment means which are located on the same side of the support member can be integrally formed, which simplifies the structure of the support assembly.

According to a preferred embodiment, the sheath of the first Bowden cable arrangement and the sheath of the second Bowden cable arrangement each comprise a first portion and a second portion which are separated from each other. For the first Bowden cable arrangement, the first portion of the sheath extends from the actuator to a first frame attachment means for attaching the first portion of the sheath to the seat frame, and the second portion of the sheath extends from the first attachment means to the second attachment means. For the second Bowden cable arrangement, the first portion of the sheath extends from the actuator to a second frame attachment means for attaching the first portion of the sheath to the seat frame, and the second portion of the sheath extends from the third attachment means to the fourth attachment means. With such a configuration, it is possible to symmetrically act on both sides of the support member in the two support regions by using only two single Bowden cables, each for one of the different support regions.

Also according to a further preferred embodiment, the sheath of the first Bowden cable arrangement and the sheath of the second Bowden cable arrangement each comprise a first portion and a second portion which are separated from each other. According to this embodiment, the first attachment means and the third attachment means are located on opposite sides of the support member. For the first Bowden cable arrangement, the first portion of the sheath extends from the first attachment means to the actuator and the second portion of the sheath extends from the actuator to the second attachment means. For the second Bowden cable arrangement, the first portion of the sheath extends from the third attachment means to the actuator and the second portion of the sheath extends from the actuator to the fourth attachment means. A second end portion of the wire of the first Bowden cable arrangement extends from the second attachment means, and a second end portion of the wire of the second Bowden cable arrangement extends from the fourth attachment means. Also in this structure, it is possible to symmetrically act on the two sides of the support member in each of the support regions by using only a single Bowden cable for each of the support regions.

According to an embodiment, the first Bowden cable arrangement and the second Bowden cable arrangement each comprise a wire guided in a sheath, and a cable-splitting means for transmitting tension in the wire to a further wire. The wire and the further wire may then be used to couple opposite sides of the support element to the seat frame. According to the embodiment, the cable-splitting means comprises a fixed member, e.g. a housing, to which a first portion of the sheath is connected and a slide member which is slidably coupled to the fixed member, e.g. slidably received within a guide channel of the fixed member, and to which a second portion of the sheath is connected. The wire of the Bowden cable arrangement extends through the cable-splitting means from the first portion of the sheath to the second portion of the sheath, tensioning of the Bowden cable arrangement causing the slide member to move with respect to the fixed member. The further wire is connected to the slide member, thereby transmitting tension via the movement of the slide member with respect to the fixed member. According to a preferred embodiment, the fixed member of the cable-splitting means comprises a clip portion for attaching the cable-splitting means to the support member. Preferably, the clip portion is attached to a side wire of the support member at one side thereof.

In the above embodiment, a preferred actuator comprises a slide member which is slidably connected to a fixed member of the actuator, the first portion of the sheath of the first Bowden cable arrangement and the first portion of the sheath of the second Bowden cable arrangement being coupled to the slide member and the second portion of the sheath of the first Bowden cable arrangement and the second portion of the sheath of the second Bowden cable arrangement being coupled to the fixed member. In this structure, by moving the slide member in one direction the tension in the first Bowden cable arrangement is increased and the tension in the second Bowden cable arrangement is decreased, and by moving the slide member in a second direction the tension in the first Bowden cable arrangement is decreased and the tension in the second Bowden cable arrangement is increased. The actuator preferably comprises means for moving the slide member, e.g. a toothed wheel which is engaged with a toothed surface of the slide member or a threaded shaft which is engaged with a complementary thread of the slide member.

Another type of actuator which can be used in connection with the present invention comprises winding means for winding a wire of the first Bowden cable arrangement and the wire of the second Bowden cable arrangement in opposite directions. This means that when the wire of the first Bowden cable arrangement is wound, the wire of the second Bowden cable arrangement is unwound and vice versa.

According to the present invention, both manual-driven and motor-driven actuators may be used.

Further, it is preferred that an unsheathed portion of the wire of the first Bowden cable arrangement and/or an unsheathed portion of the wire of the second Bowden cable arrangement is covered with a plastic material. By this means, it is avoided that unsheathed portions of the wires generate noise in a situation that there is low tension on the respective Bowden cable and movement of the wire becomes possible.

Preferably, the routing of the first Bowden cable arrangement and of the second Bowden cable arrangement provides a substantially uniform curvature of the sheathed portions of the Bowden cable arrangements. That is to say, abrupt bendings of the sheathed portions are avoided. For example, the sheathed portions may be routed so as to extend substantially in the same direction throughout there length of the respective sheathed portion, or only a single curvature may be provided for each sheathed portion, i.e. changes in the sense of curvature are avoided. By this means, the durability of the support assembly with respect to the number of cycles can be increased. This constitutes a significant advantage, e.g. when implementing a massage function.

According to a second aspect of the invention, a support assembly has a first support region with adjustable degree of support and a second support region with adjustable degree of support. The support assembly comprises a support member for incorporation into a seat frame, a first adjustment arrangement for adjusting the degree of support in the first support region, a second adjustment arrangement for adjusting the degree of support in the second support region, and an actuator coupled to the first adjustment arrangement and to the second adjustment arrangement, the actuator being configured to simultaneously act on the first adjustment arrangement and on the second adjustment arrangement in opposite directions. The actuator is attached to the support member.

By having the actuator attached to the support member, the actuator can be positioned in a more flexible way, in particular further away from the head of a seat occupant, which is advantageous with respect to noise generation. Further, the overall structure of the support assembly can be simplified and engineering time thus reduced.

Otherwise, the support assembly of the second aspect of the invention may be similar to that of the first aspect. In particular, the first adjustment arrangement and the second adjustment arrangement may each comprise a Bowden cable arrangement. Further, each of the Bowden cable arrangements may be coupled to a wire-length control mechanism as described in connection with the first aspect of the invention.

According to a third aspect of the invention, a support assembly has a first support region with adjustable degree of support, a second support region with adjustable degree of support, a third support region with adjustable degree of support, and a fourth support region with adjustable degree of support. The support assembly comprises a support member for incorporation into a seat frame, a first adjustment arrangement for adjusting the degree of support in the first support region, a second adjustment arrangement for adjusting the degree of support in the second support region, a third adjustment arrangement for adjusting the degree of support in the third support region, and a fourth adjustment arrangement for adjusting the degree of support in the fourth support region. Again, the adjustment arrangements may each comprise a Bowden cable arrangement. The support assembly further comprises a first actuator coupled to the first adjustment arrangement and to the second adjustment arrangement and configured to simultaneously act on the first adjustment arrangement and on the second adjustment arrangement in opposite directions, and a second actuator coupled to the third adjustment arrangement and to the fourth adjustment arrangement and configured to simultaneously act on the third adjustment arrangement and on the fourth adjustment arrangement in opposite directions.

By having the first actuator and the second actuator for adjusting the degree of support in the first support region, the second support region, the third support region, and the fourth support region, an increased range for adjusting the degree of support, e.g. in the vertical direction, can be achieved. Further, it is possible to implement a massage function through the support element with various massage patterns. In this respect, it is specifically preferred that the third support region is located between the first support region and the second support region, and that the second support region is located between the third support region and the fourth support region. That is to say, the support regions coupled to the different actuators are interleaved or mixed.

According to an embodiment, the first actuator and the second actuator are each driven by an electric motor and the support assembly further comprises a controller or electronic control unit for controlling the operation of the first actuator and the second actuator, e.g. for providing the massage function or for statically adjusting the degree of support.

Otherwise, the support assembly of the third aspect of the invention may be similar to that of the first and second aspects.

It is to be understood that features of the first, second and third aspects of the invention may be combined with each other as appropriate.

The support assembly of the present invention is preferably incorporated into a seat frame of a seat structure, e.g. for forming a vehicle seat.

The support assembly of the present invention can be realized with different types of support members, e.g. wire frameworks, plate type support members, or support members having belts formed of a plastic material.

In the following, preferred embodiments of the present invention will be explained in detail with reference to the attached drawings.

BRIEF DESCRIPTION OF THE DRAWINGS

FIGS. 10(A), (B), and (C) schematically illustrate a wire-length control mechanism according to an embodiment of the invention.

FIGS. 12(A) and (B) schematically illustrate a wire-length control mechanism according to a further embodiment of the invention.

FIGS. 30(A) and (B) schematically illustrate an alternative implementation of a support assembly according to an embodiment of the invention.

DETAILED DESCRIPTION

Figure 1:
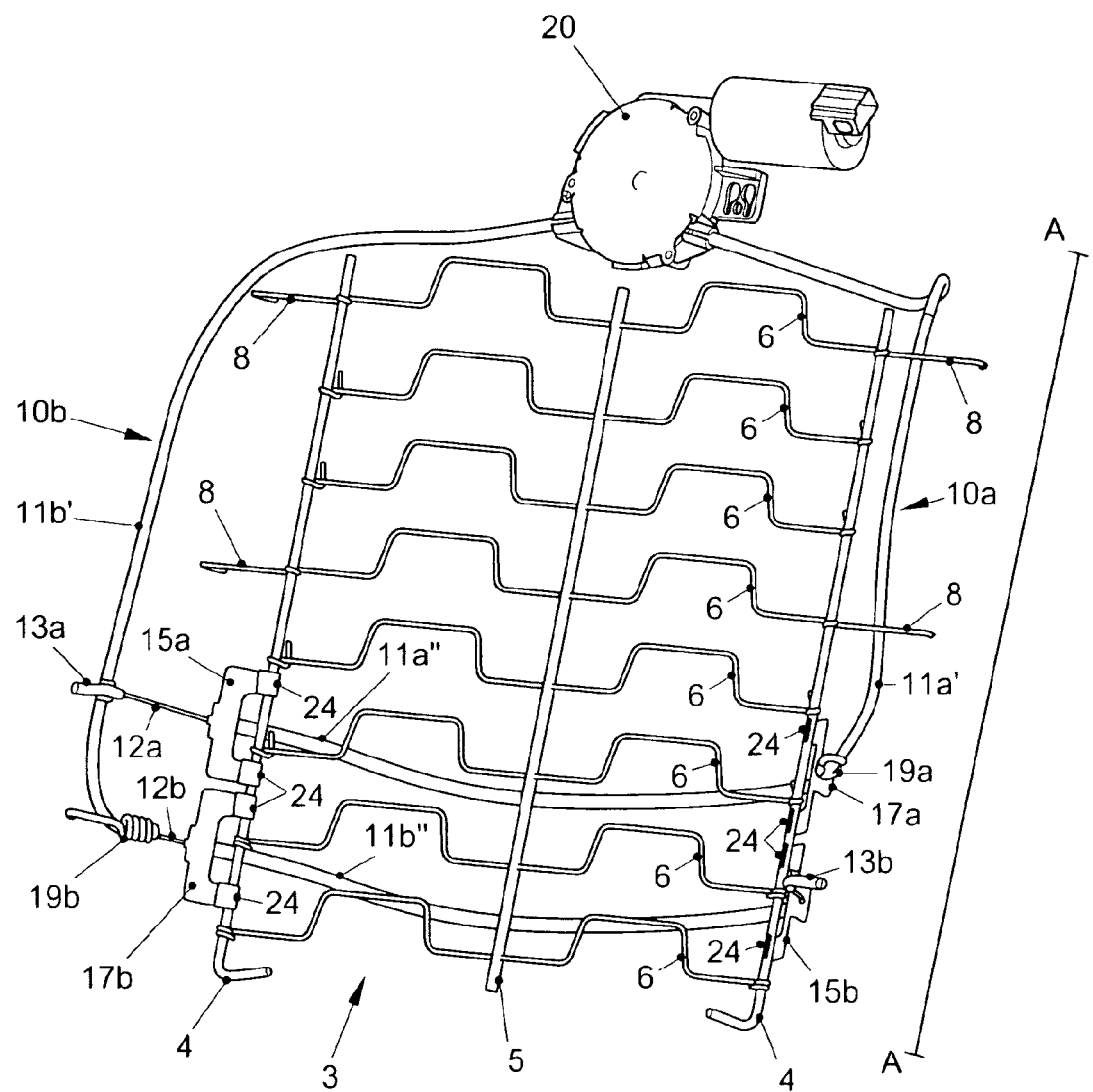
FIG. 1 shows a perspective view of a support assembly according to a first embodiment of the present invention, FIG. 2(*a*) shows a side view of the support assembly of FIG. 1, FIG. 2(*b*) schematically illustrates different support profiles of the support assembly, FIG. 2(*c*) illustrates the degree of support in a first support region and in a second support region as a function of actuator position.

FIG. 1 shows a support assembly according to a first embodiment of the present invention, the support assembly being configured to be incorporated or suspended in a seat frame of a back rest of a seat. The support assembly is configured to provide load bearing support for upholstery or cushioning of the seat by means of a support member 3. In the present embodiment, the support member is formed as a wire framework. It comprises a pair of side wires 4 forming two elongate side members and a plurality of transverse wires 6 as transverse members extending between the two side members. The transverse wires 6 are anchored to the side wires 4. According to the embodiment shown in FIG. 1, the transverse wires 6 are anchored to the side wires 4 by being wound around the latter. Intermediate portions of the transverse wires 6 are angled in the support plane so that the support member 3 becomes extensible under loading placed upon the support arrangement.

The side wires 4 may be formed by synthetic plastic covered paper-wrapped steel cords and form two generally vertical lateral rails. The transverse wires 6 extending between the two side wires 4 penetrate and intermediate vertical cord 5 of paper or synthetic plastic material which serves to provide some degree of stability to the wire framework comprising the two side wires 4 and the transverse wires 6 and maintains a predetermined vertical spacing between the transverse wires 6. Alternatively, the side members may comprise formed wires of a plastic material.

As shown in FIG. 1, the lower ends of the side wires 4 are angled so as to allow the incorporation of the support member 3 into the seat frame. The support member 3 can be suspended in the seat frame by means of tension springs anchored between the seat frame and the lower ends of the side wires 4 and some of the transverse wires 6, respectively.

As can be taken from FIG. 1, some of the transverse wires 6 extend laterally beyond the side wires 4 after having been wound around the latter and terminate in free ends 8. Some of these free ends 8 are formed into hook-like fingers which may extend in the support plane or may also be directed backwards or in any other suitable direction which allows to anchor a tension spring to the respective hook-like fingers. The fact that the extended portions 8 of the transverse wires 6 terminate in free ends enables more versatile lateral support to be provided, particularly in the lumbar region of a back rest. In particular, the hook-like fingers of the free ends 8 can be individually angled, if desired, to conform to the contour of the back rest. If the laterally extending free ends 8 are unconnected with respect to the seat frame, an effective adjustable lumbar support can be provided by arching the two side wires 4 in the lumbar region or in the pelvis region of the support member 3, as the free ends 8 can provide laterally contoured support without interfering with the arching of the two side wires 4.

If desired, the two side wires 4 may be angled to provide regions of the support member 3 which have different transverse widths between the side wires 4.

The support assembly comprises adjustment means for adjustably arching the side wires 4 in two vertically different regions of the support assembly. These adjustment means comprise an actuator 20, which in the present embodiment is electrically driven.

The support assembly comprises a first Bowden cable arrangement 10a for adjusting the degree of support in a first support region, e.g. in the lumbar region of a seat back rest. A second Bowden cable arrangement 10b is provided for adjusting the degree of support in a second support region below the first support region, e.g. in a pelvis region of the seat back rest. The first support region may also correspond to a lumbar region of a large person, while the second support region corresponds to a lumbar region of a small person, thereby allowing for the support characteristics to be adapted to different sizes of a seat occupant.

The first Bowden cable arrangement 10a and the second Bowden cable arrangement 10b each comprise an inner wire 12a, 12b and an outer sheath 11a', 11a", 11b', 11b" for guiding the wire 12a, 12b.

The support assembly comprises first attachment means 15a for attaching the sheath 11a', 11a" of the first Bowden cable arrangement 10a to a first side of the support member 3. Second attachment means 17a are provided for attaching the sheath 11a', 11a" of the first Bowden cable arrangement to a second side of the support member 3, opposite to the first side.

A first end portion 13a of the wire 12a of the first Bowden cable arrangement 10a extends from the first attachment means 15a and is adapted to be connected to the seat frame. In particular, the first end portion of the wire 12a is provided with a connecting means having the shape of a Z-nipple. From the second attachment means 17a, the first Bowden cable arrangement 10a extends to the actuator 20. A first frame attachment means 19a is provided at the side of the second attachment means 17a for attaching the sheath 11a', 11a" of the first Bowden cable arrangement 10a to the seat frame.

As illustrated in FIG. 1, the sheath 11a', 11a" of the first Bowden cable arrangement 10a comprises a first portion 11a' extending between the actuator 20 and the first frame attachment means 19a and a second portion 11a" extending between the first attachment means 15a and the second attachment means 17a. The first portion 11a' and the second portion 11a" are separated from each other, i.e. only the wire 12a of the first Bowden cable arrangement 10a extends between the second attachment means 17a and the first frame attachment means 19a.

The first frame attachment means 19a is provided with a hook-like extension for connecting to the seat frame.

As can be seen, the portions of the wire 12a of the first Bowden cable arrangement 10a extending from the first attachment means 15a and the second attachment means 17a can be symmetrically shortened by increasing the tension in the first Bowden cable arrangement 10a, thereby pulling the support member 3 towards the seat frame.

Similarly, the support assembly comprises a third attachment means 15b for attaching the sheath 11b', 11b" of the second Bowden cable arrangement 10b to the second side of the support member 3. A fourth attachment means 17b is provided for attaching the sheath 11b', 11b" of the first Bowden cable arrangement to the first side of the support member 3.

A first end portion 13b of the wire 12b of the second Bowden cable arrangement 10b extends from the third attachment means 15b and is adapted to be connected to the seat frame. In particular, the first end portion of the wire 12b is provided with a connecting means having the shape of a Z-nipple. From the fourth attachment means 17b, the second Bowden cable arrangement 10b extends to the actuator 20. A second frame attachment means 19b is provided at the side of the fourth attachment means 17b for attaching the outer sheath 11b', 11b" of the second Bowden cable arrangement 10b to the seat frame.

As illustrated in FIG. 1, the sheath 11b', 11b" of the second Bowden cable arrangement 10b comprises a first portion 11b' extending between the actuator 20 and the second frame attachment means 19b and a second portion 11b" extending between the third attachment means 15b and the fourth attachment means 17b. The first portion 11b' and the second portion 11b" are separated from each other, i.e. only the wire 12b of the second Bowden cable arrangement 10b extends between the fourth attachment means 17b and the second frame attachment means 19b.

The second frame attachment means 19b is provided with a hook-like extension for connecting to the seat frame.

As can be seen, the portions of the wire 12b of the second Bowden cable arrangement 10b extending from the third attachment means 15b and the fourth attachment means 17b can be symmetrically shortened by increasing the tension in the second Bowden cable arrangement 10b, thereby pulling the support member 3 towards the seat frame.

In the embodiment of FIG. 1, the second end portions of the wires 12a, 12b of the first and second Bowden cable arrangements are coupled to the actuator 20, which is configured to simultaneously act on the first Bowden cable arrangement 10a and the second Bowden cable arrangement 10b in opposite directions. This means that when the tension in the first Bowden cable arrangement 10a is increased, the tension in the second Bowden cable arrangement 10b is decreased and vice versa. Accordingly, the degree of support in the first support region is increased while the degree of support in the second region is decreased and vice versa. A user can select between two different heights for the support, and the degree of support can be adjusted in each of the support regions. Still only one actuator and only a single Bowden cable for each of the support regions is required.

As illustrated in FIG. 1, the first attachment means 15a, the second attachment means 17a, the third attachment means 15b, and the fourth attachment means 17b are formed as plate clips which can be clipped onto the respective side wire 4 of the support member 3 so as to attach the sheath of the Bowden cable arrangement to the respective side of the support member 3. In each case, the plate clip has two end portions 24 which are formed like a resilient or flexible hook or clip so that these end portions 24 can be easily clipped onto the respective side wire 4. Each of the plate clips has a hole through which the wire 12a, 12b of the respective Bowden cable arrangement 10a, 10b extends.

The first frame attachment means 19a is formed as a spring which is wound around an end portion of the first portion 11a' of the sheath of the first Bowden cable arrangement 10a. From the spring there extends the hook-like extension for connecting the first frame attachment means 19a to the seat frame. Similarly, the second frame attachment means 19b is formed as a spring wound around an end portion of the first portion 11b' of the sheath of the second Bowden cable arrangement 10b, and, the extension which has a hook-like shape for connecting to the seat frame extending therefrom. These hook-like extensions of the frame attachment means 19a, 19b as well as the Z-nipples and the first end portions of the wires 12a, 12b are inserted to corresponding receiving structures on the seat frame, which are preferably located near the front edge of the seat frame. Therefore, when increasing the tension in one of the Bowden cable arrangements 10a, 10b, the support member 3 is pulled towards the front edge of the seat frame in the corresponding support region and the degree of support is increased. If the tension in the Bowden cable arrangement 10a, 10b is decreased, the support member 3 will move back due to the resilient characteristics of the support member 3 itself and/or due to the elastic suspension of the support member 3 in the seat frame.

FIG. 2(a) shows a side view of the support assembly of FIG. 1. In FIG. 2(a), the seat frame is indicated by a dashed line denoted by 1. As can be seen, the first frame attachment means 19a and the first end portion 13b of the wire 12b are connected to the seat frame 1 near the front edge of the seat frame 1. By increasing the tension in the first Bowden cable assembly 10a, the support member 3 is moved towards the front edge of the seat frame 1, thereby increasing the degree of support. Simultaneously, the tension in the second Bowden cable arrangement 10b is decreased and the support member 3 moves backward from the front edge of the seat frame 1, thereby decreasing the degree of support. This is in FIG. 2(a) illustrated by arrows near the frame attachment means 19a and the first end portion 13b of the wire 12b. A similar configuration is provided on the opposite side of the support assembly.

FIG. 2(b) schematically illustrates support profiles provided by the support assembly as shown in FIG. 2(a). A solid line illustrates a maximum support configuration in the first support region. A dashed line illustrates a maximum support configuration in the second support region. By means of the actuator 20, it is possible to continuously change between the support configurations and to adjust the degree of support in each of the support regions.

FIG. 2(c) illustrates the degree of support S in the first support region and in the second support region as a function of actuator position A. The degree of support in the first support region is illustrated by a solid line and the degree of support in the second support region is illustrated by a dashed line. As can be seen, as the actuator position advances from left to right in FIG. 2(c), the degree of support in the second support region decreases from maximum to zero. After an intermediate region in which actually no increased support is provided in either support region, the degree of support in the first support region increases from zero to maximum. Of course the traces shown in FIGS. 2(b) and (c) are only schematic and it is possible to adapt the actual characteristics of the support assembly to specific requirements, for example by adjusting the tensions of the first Bowden cable arrangement 10a and a second Bowden cable arrangement 10b relative to each other.

Figure 3:
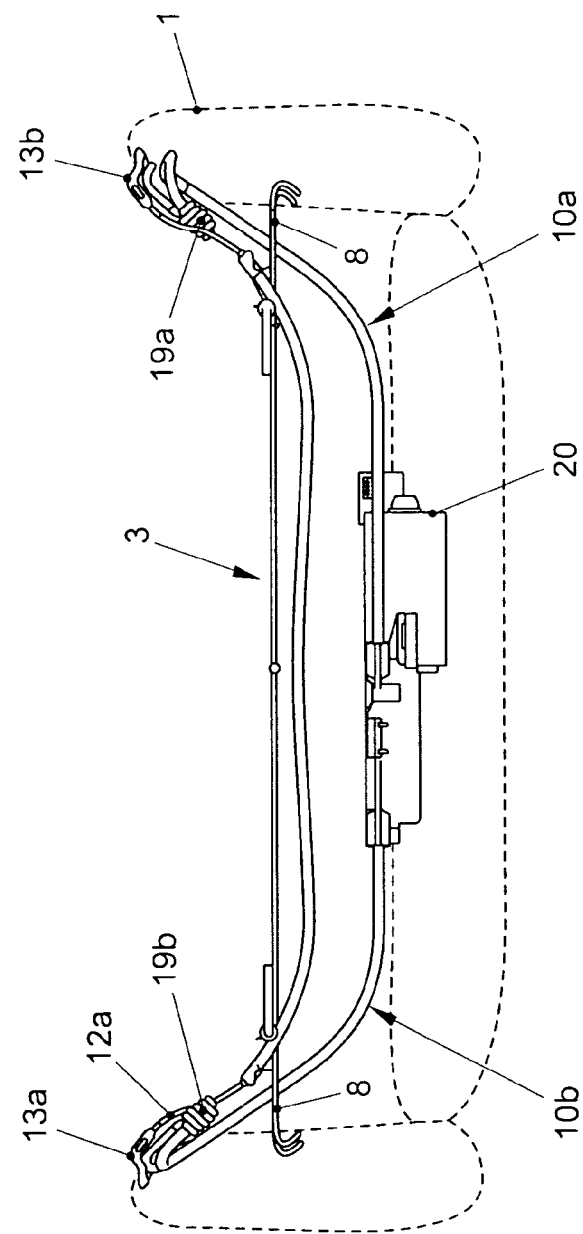
FIG. 3 shows a bottom view of the support assembly of FIG. 1.

FIG. 3 shows a bottom view of the support assembly as shown in FIG. 1. As can be seen, the actuator 20 can be easily accommodated in a rear region of the seat frame 1.

Figure 4:
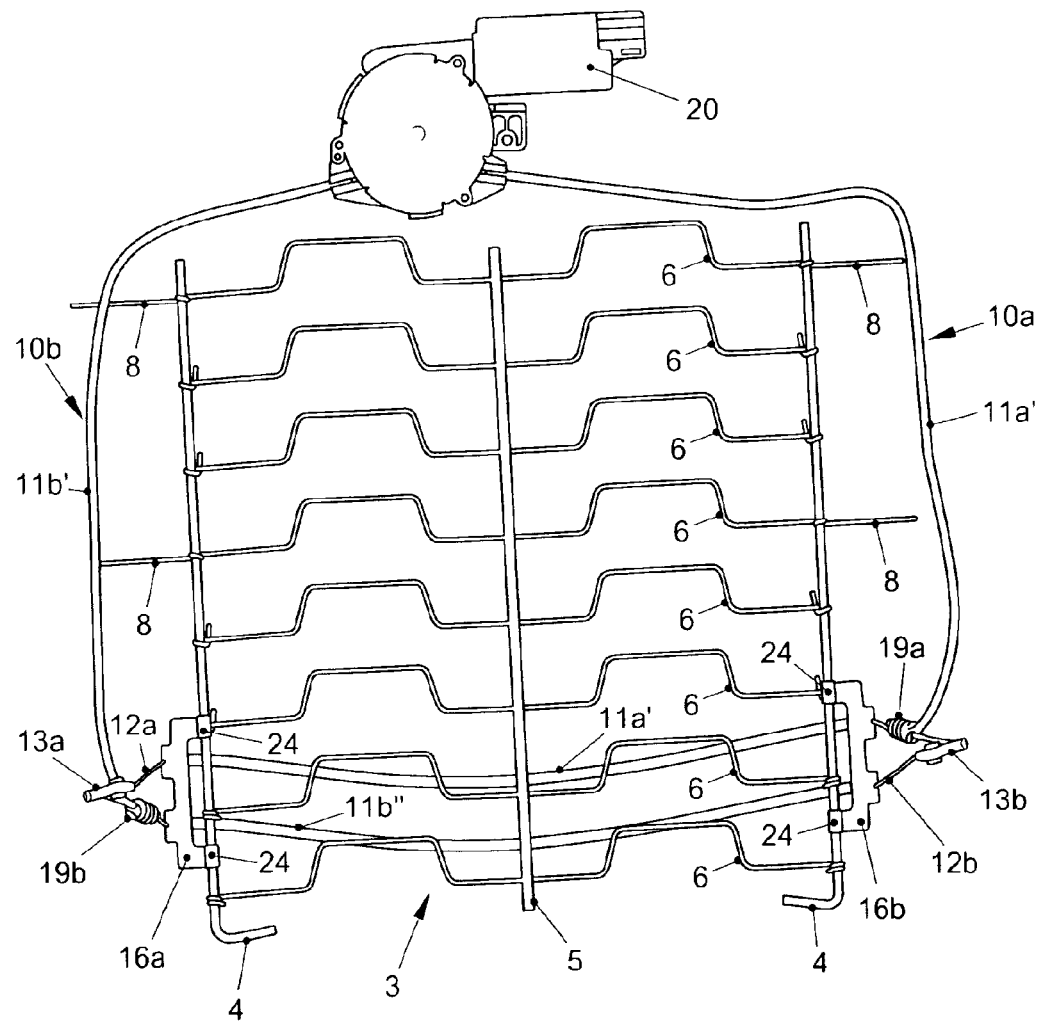
FIG. 4 shows a support assembly according to a second embodiment of the present invention, FIG. 5 schematically illustrates an actuator of the embodiments as shown in FIGS. 1-4.

FIG. 4 illustrates a second embodiment of the support assembly according to the present invention. The support assembly of FIG. 4 generally corresponds to that of FIGS. 1-3, and similar components have been designated by the same reference numerals. In the following, only the differences as compared to the support assembly of FIG. 1-3 will be explained.

In the support assembly of FIG. 4, the first attachment means 15a and the fourth attachment means 17b of the support assembly as shown in FIG. 1 have been integrated into a single plate clip 16a. Similarly, the second attachment means 17a and the third attachment means 15b have been integrated into a single plate clip 16b. As in the embodiment of FIGS. 1-3, the plate clips 16a and 16b are provided with two end portions 24 which are formed like a resilient or flexible hook or clip for attaching these end portions 24 to the respective side wire 4.

Further, a connecting portion of the first end portion 13a of the wire 12a of the first Bowden cable arrangement 10a is integrally connected with the second frame attachment means 19b. Similarly, a connecting portion of the first end portion 13b of the wire 12b of a second Bowden cable arrangement 10b is integrally connected with the first frame attachment means 19a. This can, for example, be achieved by forming a Z-nipple from the first end portion of the wires 12a, 12b from the same wire which is wound around the sheath 11a', 11b' of the Bowden cable arrangements 10a, 10b for forming the frame attachment means 19a, 19b. Further, it is possible to form the Z-nipple with a structure for receiving the sheath 11a', 11b' of the respective Bowden cable arrangement 10a', 10b".

In the support assembly of FIG. 4, fewer components are required and therefore a simplified structure is achieved. Further, only one receiving structure is required on each side of the seat frame for connecting the first end portions 13a, 13b of the wires 12a, 12b and the sheaths 11a', 11b' of the Bowden cable arrangements 10a, 10b to the seat frame.

Figure 5:
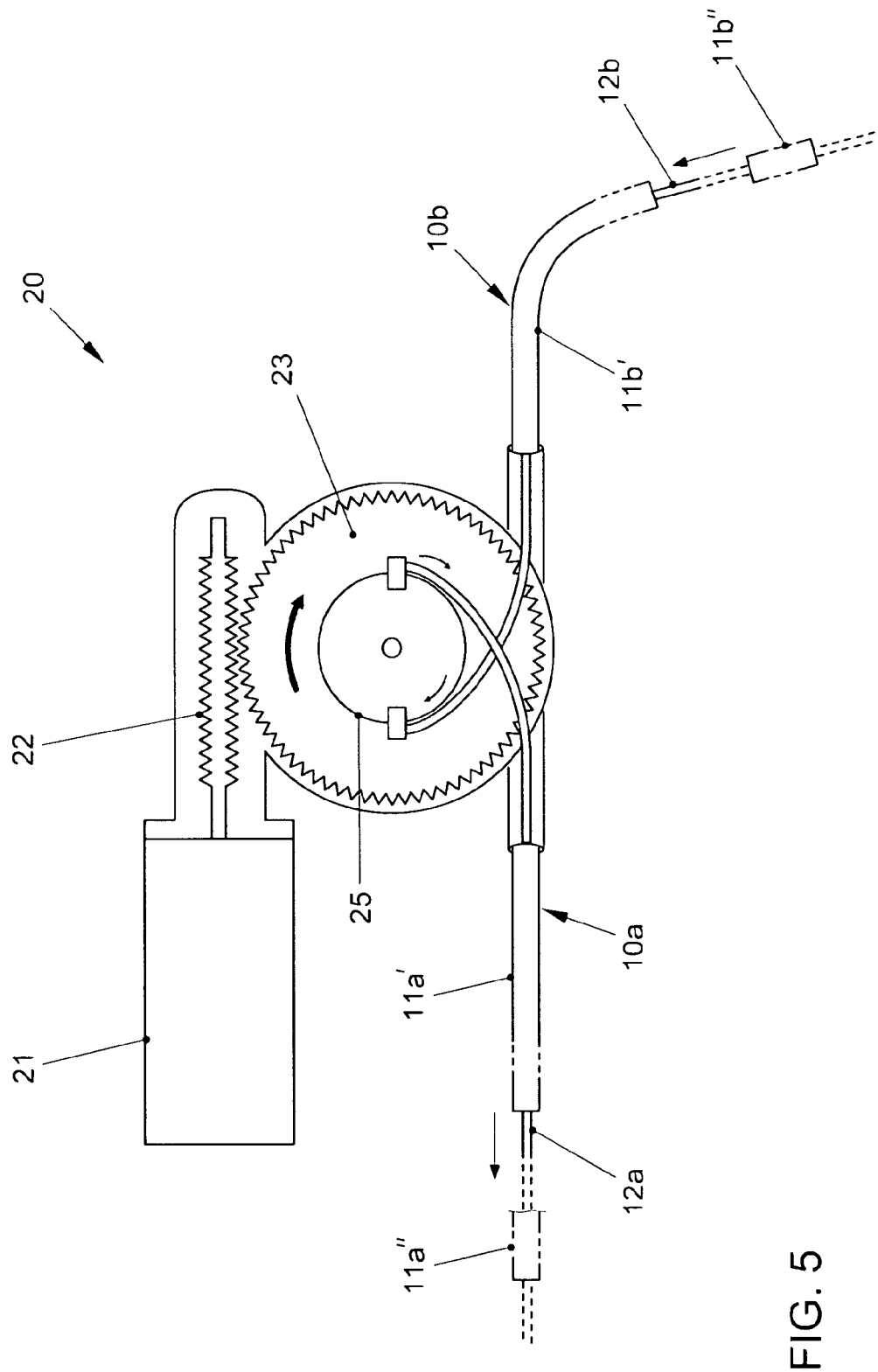

FIG. 5 schematically illustrates the actuator 20 of the support assemblies as shown in FIGS. 1-4. The actuator 20 comprises an electrically operated motor 21. A drive shaft of the motor 21 is provided with a worm 22 which is engaged with a toothed wheel 23. Accordingly, by operating the motor 21, the toothed wheel 23 is caused to rotate. On the toothed wheel 23 a winding means 25 is provided, to which the second end portion of the wire 12a of the first Bowden cable arrangement 10a and the second end portion of the wire 12b of the second Bowden cable arrangement 10b are coupled. As can be seen, the end portions of the wires 12a, 12b are coupled to the winding means 25 in such a manner that rotation of the winding means 25 in one direction causes the wire 12b of the first Bowden cable arrangement 10b to be wound while the wire 12a of the first Bowden cable arrangement 10a is caused to be unwound. Consequently, the tension in the first Bowden cable arrangement 10a is decreased and the tension in the second Bowden cable arrangement 10b is increased, as illustrated by the arrows. When the motor 21 is operated in the opposite direction, the wire 12a of the first Bowden cable arrangement 10a is wound while the wire 12b of the second Bowden cable arrangement 10b is unwound, thereby increasing the tension in the first Bowden cable arrangement 10a and decreasing the tension in the second Bowden cable arrangement 10b.

The worm gear formed of the worm 22 and the toothed wheel 23 provides the actuator 20 with a self-blocking capability, i.e. any torque applied to the toothed wheel 23 from the Bowden cable arrangements will not change the position of the actuator.

Figure 6:
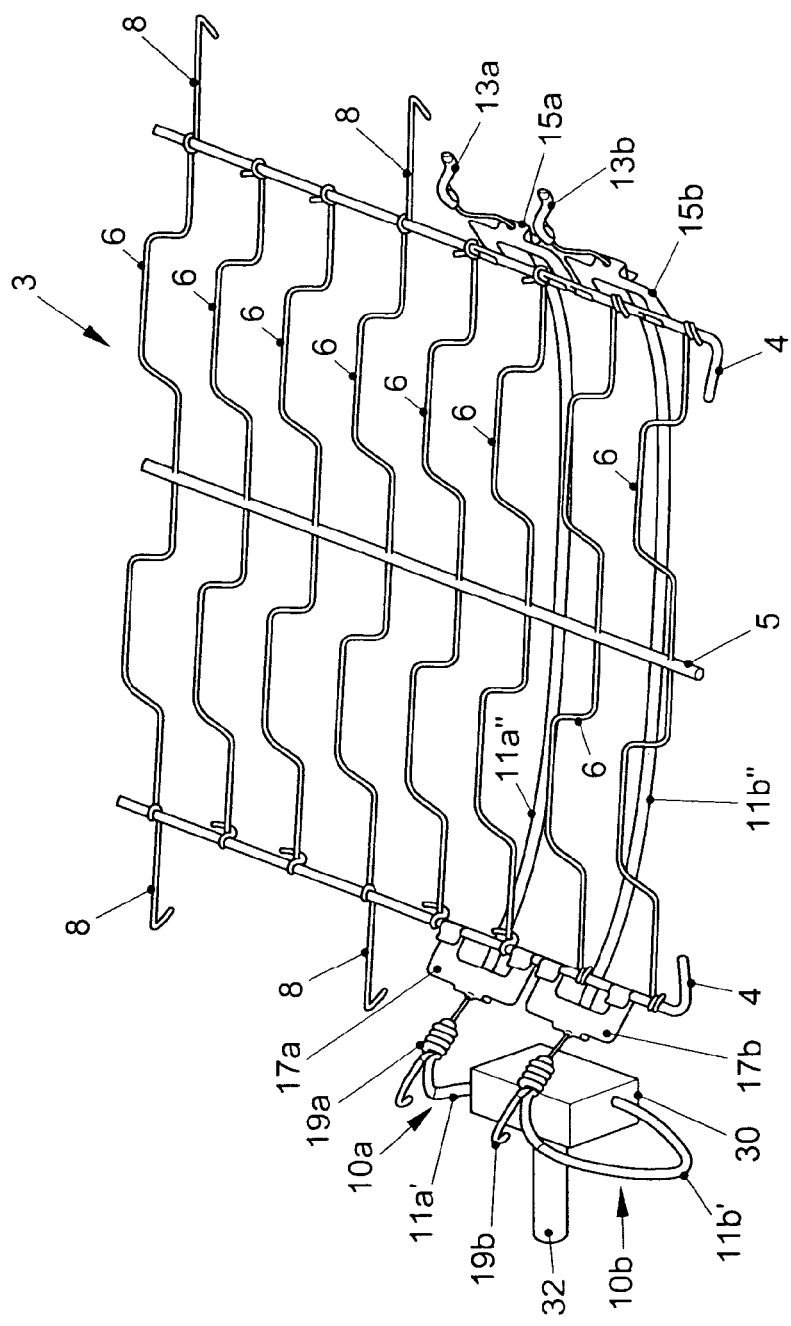
FIG. 6 shows a support assembly according to a third embodiment of the present invention.

FIG. 6 illustrates a support assembly according to a third embodiment. The embodiment of FIG. 6 generally corresponds to the support assembly as shown in FIGS. 1-3 and similar components have been designated with the same reference numerals. In the following, only the differences as compared to the support assembly of FIGS. 1-3 will be explained. While in the support assembly of FIGS. 1-3 the first attachment means 15a and the fourth attachment means 17b are located on the same side of the support member 3, in the support assembly of FIG. 6 the first attachment means 15a and the third attachment means 15b are located on the same side of the support member. Consequently, also the second attachment means 17a and the fourth attachment means 17b are located on the same side of the support member 3, but opposite to the first and third attachment means 15a, 15b. In particular, the first attachment means 15a and the third attachment means 15b are located on the second side of the support member 3 and the second attachment means 17a and the fourth attachment means 17b are located on the first side of the support member 3.

In the arrangement of FIG. 6, the connection from the actuator 30 to the support member 3 can be made from the same side. Therefore, if the actuator is located on the side of the seat structure as illustrated in FIG. 6, the length of the Bowden cable arrangements 10a, 10b can be reduced. This arrangement is particularly useful if the actuator 30 is a manual actuator which is typically located on the side of a seat structure so as to be easily accessible by a user. The actuator 30 shown in FIG. 6 is a manually operated actuator and comprises an actuating knob or shaft 32 for manual operation by the user. Of course, the support assembly as shown in FIG. 6 could also be provided with an electrically operated actuator.

Further, it would be possible to integrally form the first and third attachment means 15a, 15b and the second and fourth attachment means 17a, 17b. Moreover, the first frame attachment means 19a and the second frame attachment means 19b could be integrally formed, and the first end portions 13a, 13b of the wires 12a, 12b could be connected to a single connecting means, e.g. a Z-nipple. This arrangement would have characteristics similar to that of the second embodiment described with reference to FIG. 4.

Figure 7:
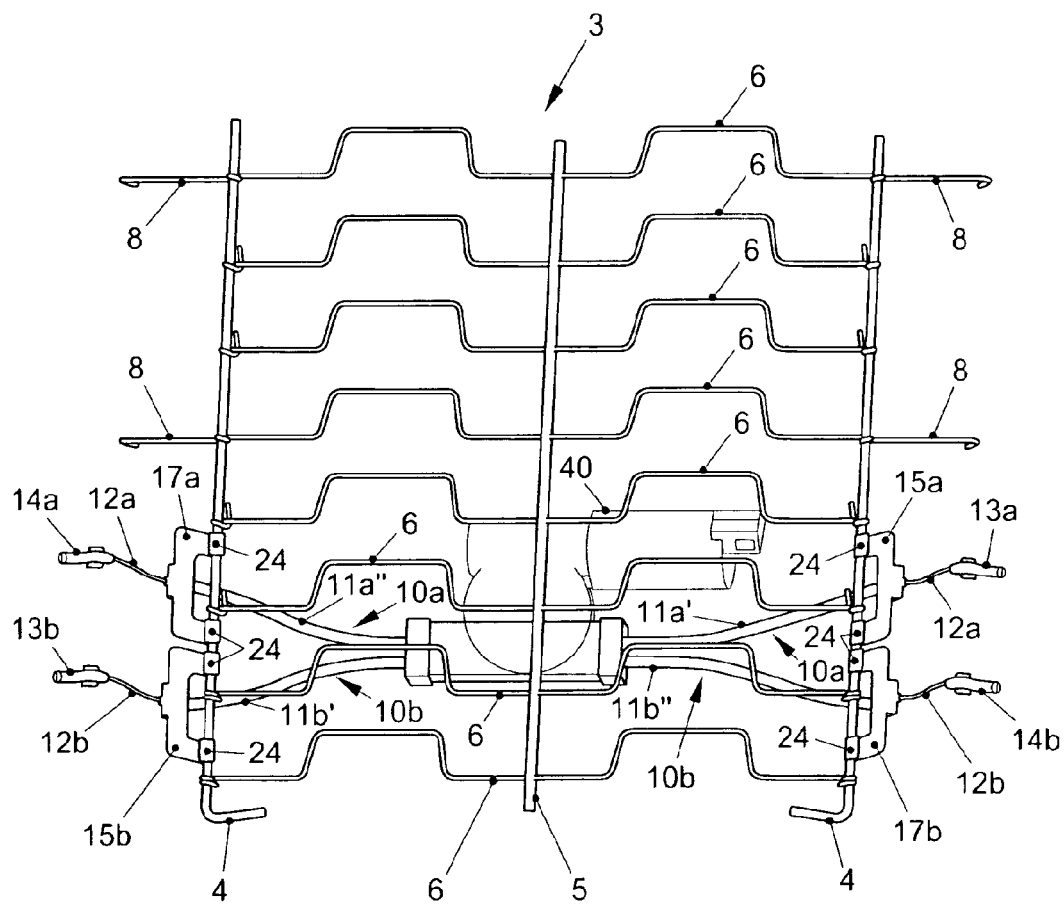
FIG. 7 shows a support assembly according to a fourth embodiment of the present invention, and FIG. 8 schematically illustrates an actuator as used in the embodiment of FIG. 7.

FIG. 7 shows a fourth embodiment of a support assembly according to the present invention. Components corresponding to those of the embodiment as shown in FIGS. 1-3 have been designated with the same reference numerals and further explanations thereof will be omitted. In the following, only the differences as compared to the support assembly of FIGS. 1-3 will be explained.

As in the embodiment of FIGS. 1-3, the support assembly of FIG. 7 has a first end portion 13a of the wire 12a of the first Bowden cable arrangement 10a extending from the first attachment means 15a. Similarly, the first end portion 13b of the wire 12b of the second Bowden cable arrangement 10b extends from the third attachment means 15b. However, from the first attachment means 15a, the first Bowden cable arrangement 10a extends to an actuator 40, and from the actuator 40 the first Bowden cable arrangement 10a extends to the second attachment means 17a. A second end portion 14a of the wire 12a of the first Bowden cable arrangement extends from the second attachment means 17a and is configured to be connected to the seat frame. Similarly, the second Bowden cable arrangement 10b extends from the third attachment means 15b to the actuator 40, and from the actuator 40 to the fourth attachment means 17b. A second end portion 14b of the wire 12b of the second Bowden cable arrangement 10b extends from the fourth attachment means 17b. The first end portions 13a, 13b and the second end portions 14a, 14b of the wires 12a, 12b are adapted to be connected to the seat frame by being provided with connecting means having the shape of a Z-nipple, as shown in FIG. 7.

The sheath 11a', 11a" of the first Bowden cable arrangement 10a has a first portion 11a' and a second portion 11a" which are separated from each other. The first portion 11a' of the sheath extends from the first attachment means 15a to the actuator 40. The second portion 11a" of the sheath extends from the actuator 40 to the second attachment means 17a. The wire 12a of the first Bowden cable arrangement 10a extends through the actuator 40.

Similarly, the sheath 11b', 11b" of the second Bowden cable arrangement 10b has a first portion 11b' and a second portion 11b" which are separated from each other. The first portion 11b' of the sheath extends from the third attachment means 15b to the actuator 40. The second portion 11b" of the sheath extends from the actuator 40 to the fourth attachment means 17b. The wire 12b of the second Bowden cable arrangement 10b extends through the actuator 40.

The actuator 40 is configured to simultaneously increase the tension in the first Bowden cable arrangement 10a and decrease the tension in the second Bowden cable arrangement 10b and vice versa. The actuator may be attached to the support member 3.

As further illustrated in FIG. 7, the routing of the first Bowden cable arrangement and of the second Bowden cable arrangement provides for a uniform curvature of the sheathed portions. That is to say, each of sheathed portions substantially extends in a single direction, thereby avoiding any significant bendings. By this means, the durability of the support assembly with respect to the number of cycles is improved. This is advantageous with respect to applications requiring a large number of cycles, such as massage applications.

Figure 8:
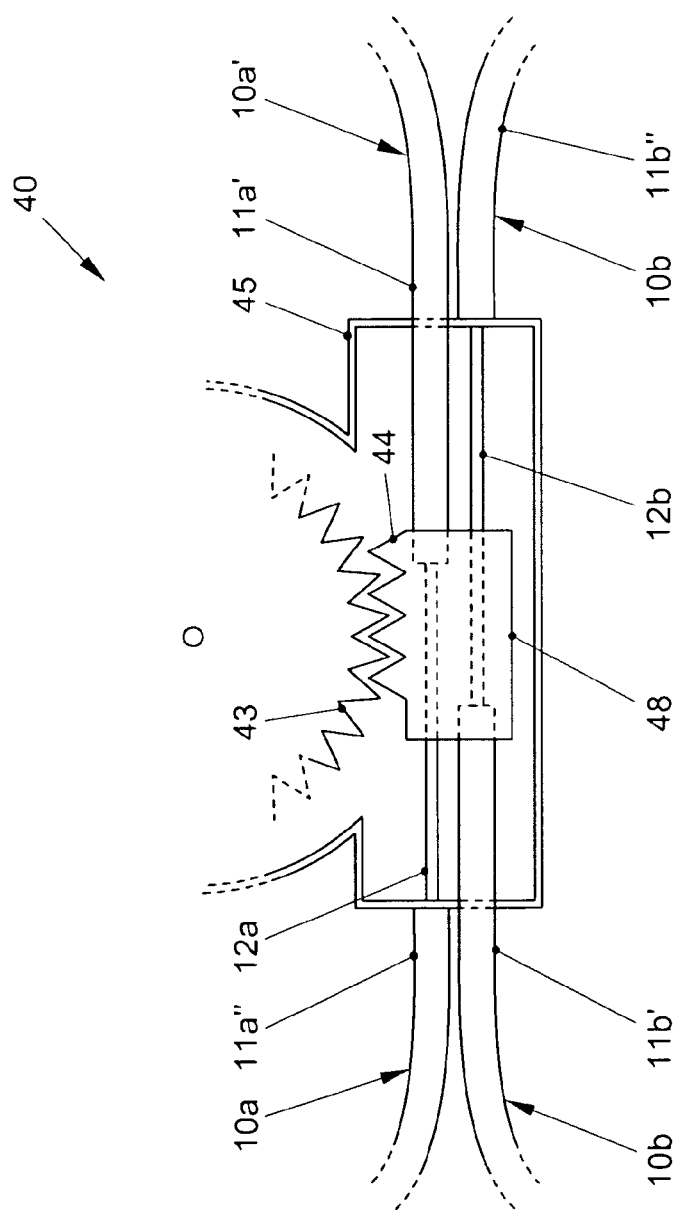

An implementation of the actuator 40 is illustrated in FIG. 8. As illustrated in FIG. 8, the actuator 40 comprises a housing 45 which constitutes a fixed member and a slide member 48 which is slidable with respect to the housing 45. As illustrated, the first Bowden cable arrangement 10a and the second Bowden cable arrangement 10b extend through the actuator housing 45 along an essentially transversal direction, and the slide member 48 is slidable with respect to the housing 45 along this transversal direction.

The first portion 11a' of the sheath of the first Bowden cable arrangement 10a is connected to the slide member 48. The second portion 11a" of this sheath of the first Bowden cable arrangement 10a is connected to the housing 45. Similarly, the first portion 11b' of the sheath of the second Bowden cable arrangement 10b is connected to the slide member, while the second portion 11b" of the sheath of the second Bowden cable arrangement 10b is connected to the housing 45. Consequently, by moving the slide member 48 along the transversal direction; the distance between the first portion 11a' and the second portion 11a" of the sheath of the first Bowden cable arrangement 10a and the distance between the first portion 11b' and the second portion 11b" of the sheath of the second Bowden cable arrangement 10b are modified in opposite directions, thereby changing the tension. In particular, if the slide member 48 is moved to the right of FIG. 8, the tension in the first Bowden cable arrangement 10a is increased, and the tension in the second Bowden cable arrangement 10b is decreased. Conversely, when the slide member 48 is moved to the left, the tension in the first Bowden cable arrangement 10a is decreased and the tension in the second Bowden cable arrangement 10b is increased.

As further illustrated, the actuator 40 comprises means for moving the slide member 48 along a transversal direction. For this purpose, the actuator 40 comprises a toothed wheel 43 which is engaged with a toothed surface 44 of the slide member 48. The toothed wheel 43 is preferably driven by an electric motor (not illustrated in FIG. 8).

Figure 9:
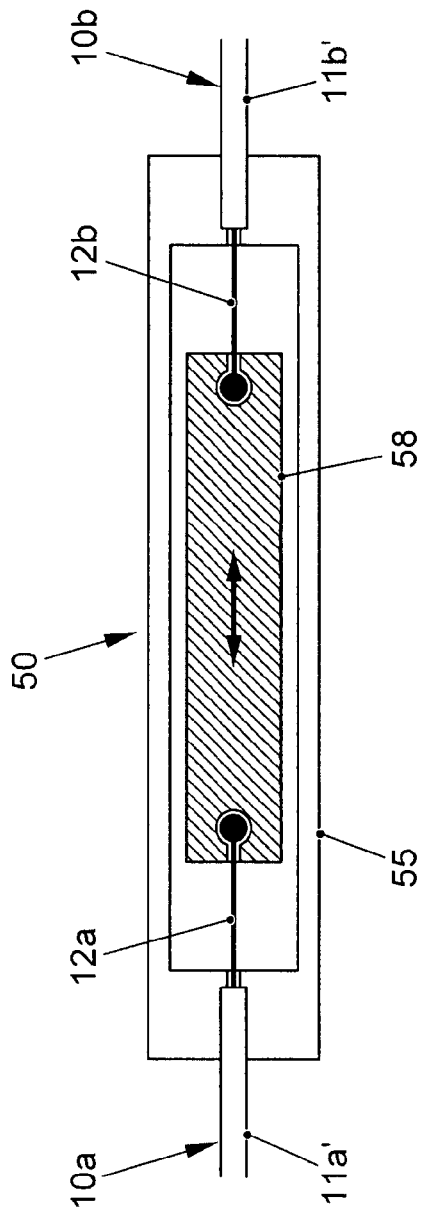
FIG. 9 schematically illustrates an actuator according to a further embodiment of the invention.

FIG. 9 schematically illustrates an actuator 50 according to a further embodiment of the invention, which may be combined with the above-described support assemblies. As illustrated in FIG. 9, the actuator 50 comprises a housing 55, which constitutes a fixed, and a slide member 58 which is slidable with respect to the housing 55. The first Bowden cable arrangement 10a and the second Bowden cable arrangement 10b are each coupled to the housing 55 at opposite ends thereof. The slide member 58 is slidable in a direction essentially extending between these two opposite ends of the housing 55.

As further illustrated, the sheaths 11a', 11b' of the Bowden cable arrangements 10a, 10b are each fixed to the housing 55, with the wires 12a, 12b extending into the housing 55. The ends the wires 12a, 12b are coupled to the slide member 58 at opposite ends thereof. Accordingly, by moving the slide member 58 in the sliding direction, as illustrated by the double-headed arrow, the tension in one of the Bowden cable arrangements 10a, 10b is decreased whereas the tension in the other Bowden cable arrangement is increased. Different mechanisms may be provided for moving the slide member 58 in the sliding direction, e.g. an electric motor, a toothed wheel, and a toothed surface, as explained in connection with FIG. 8.

In the above-described embodiments, the tension in the second Bowden cable arrangement 10b decreases when the tension in the first Bowden cable arrangement 10a increases and vice versa. Eventually, there may be no tension at all in one of the Bowden cable arrangements 10a, 10b. In this case, unsheathed portions of the wires 12a, 12b can more freely move and may come into contact with metallic surfaces of the seat structure. In order to avoid an undesirable generation of noise, it is therefore preferable to cover unsheathed portions of the wires 12a, 12b with a plastic material. Such unsheathed portions may in particular exist in the vicinity of the attachment means 15a, 17a, 15b, 17b, 16a, 16b. For the same reasons, it is preferable to cover the connecting means for connecting the end portions 13a, 13b, 14a, 14b of the wires 12a, 12b to the seat frame with a plastic material so as to avoid metal to metal contact.

The support assemblies according to the above-described embodiments further comprise a wire-length control mechanism coupled to the first and/or to the second Bowden cable arrangements 10a, 10b. The wire-length control mechanism may be provided in any of the above described embodiments, in either one of the Bowden cable arrangements or in both Bowden cable arrangements, as appropriate. By means of the wire-length control mechanism, an excessive length of the wire of the Bowden cable arrangement can be absorbed in a controlled way. The wire-length control mechanism may be a part of the actuator, e.g. the above-described actuators 20, 30, 40, 50, or may be provided as a separate component. Details and possible implementations of the wire-length control mechanism will be described below.

In FIGS. 10(A), 10(B), and 10(C) a wire-length control mechanism 60 according to an embodiment of the invention is illustrated. The wire-length control mechanism 60 is illustrated as applied to the first Bowden cable arrangement 10a. However, it is to be understood that the wire-length control mechanism 60 could also be used with the second Bowden cable arrangement 10b.

As illustrated, the wire-length control mechanism 60 comprises a jacket or tubular housing 62 through which the wire 12a of the Bowden cable arrangement 10a extends. The sheath of the Bowden cable arrangement 10a is separated into two portions. The first portion is fixed to the jacket 62 at one end thereof, whereas the other portion of the sheath extends into the jacket 62 at the other end thereof and is slidable within the jacket 62. The second portion of the sheath is fixed to a slide member 66 received inside the jacket 62. An elastic member 65 is provided so as to bias the second portion of the sheath away from the first portion of the sheath. In the illustrated embodiment, the elastic member 65 is implemented as a spring arranged within the jacket 62 between the slide member 66 and an inner end surface of the jacket 62. In other embodiments, other types of elastic members may be provided. Further, it is to be understood that the slide member 66 could be omitted and the elastic member 65 could be coupled directly between the jacket 62 and the second portion of the sheath.

In the sequence of FIGS. 10(A), (B), and (C) the operation of the wire-length control mechanism is illustrated. In FIG. 10(A), the tension of the Bowden cable arrangement 10a pulls the second portion of the sheath and the slide member 66 into the jacket 62, against the biasing force of the elastic member 65. In FIG. 10(B) the tension is decreased as compared to the situation of FIG. 10(A). Accordingly, the second portion of the sheath and the slide member 66 move further away from the first portion of the sheath and the corresponding end of the jacket 62. In FIG. 10(C), the tension is even further decreased, thereby moving the second portion of the sheath and the slide member 66 even further away from the first portion of the sheath and the corresponding end of the jacket 62. As can be seen, even when the tension decreases, no slack of the wire 12a arises, and an excessive length of the wire 12a, which is not pulled into the sheath of the Bowden cable arrangement 10a, is absorbed within the jacket 62.

Figure 11A:
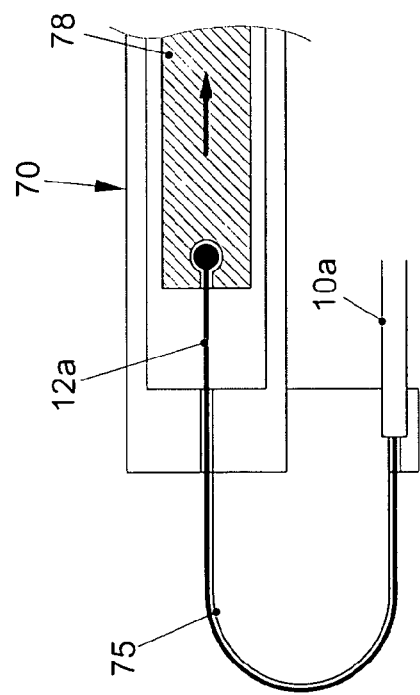
FIGS. 11(A) and (B) schematically illustrate a wire-length control mechanism according to a further embodiment of the invention.

In FIGS. 11(A) and (B), a wire-length control mechanism according a further embodiment of the invention is illustrated. The wire-length control mechanism is implemented within an actuator 70, which may be similar to the actuator 50 of FIG. 9. Again, a slide member 78 is provided, which is slidable with respect to a housing of the actuator. The wire of the Bowden cable arrangement 10a is coupled to the slide member 78, and the sheath of the Bowden cable arrangement 10a is fixed to the housing.

As further illustrated, an outwardly curved guide surface 75 is provided for guiding the wire 12a along an arc of substantially 180°. The guide surface 75 may be provided with a groove for receiving the wire 12a and may be provided with a low-friction surface. In particular, the guide surface 75 may be formed of a suitable plastic material having low-friction characteristics with respect to the material of the wire 12a.

The operation of the wire-length control mechanism is illustrated in FIGS. 11(A) and (B). In FIG. 11(A), the tension in the Bowden cable arrangement 10a causes the wire 12a to be pulled against and along the guide surface 75. Accordingly, by moving the slide member 78 in the direction of the arrow in FIG. 11(A), the tension in the Bowden cable arrangement 10a can be further increased.

Figure 11B:
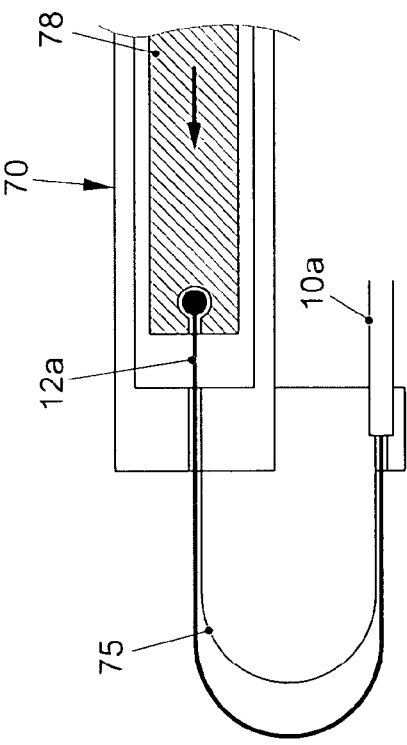

In FIG. 11(B), the tension in the Bowden cable arrangement 10a is decreased as compared to the situation of FIG. 11(A), by moving the slide member 78 in the direction of the arrow in FIG. 11(B). An excessive length of the wire 12a, which is not pulled into the sheath of the Bowden cable arrangement 10a, forms a loop outwardly extending from the guide surface 75. Accordingly, the excessive length of the wire 12a can be absorbed in a controlled way.

FIG. 12 illustrates a wire-length control mechanism according to a further embodiment of the invention. The wire-length control mechanism of FIG. 12 generally corresponds to that of FIG. 11, and in the following only the differences as compared to the wire-length control mechanism of FIG. 11 will be explained. Again, the wire-length control mechanism is implemented within an actuator 70', which may be similar to the actuator 50 of FIG. 9.

In the wire-length control mechanism of FIG. 12, the guide surface 75 of FIG. 11 is replaced by a pulley 75'. The pulley 75' may be formed from a suitable plastic material and have a guide groove on the outer surface. By means of the pulley 75', the wire 12a is guided along an arc of substantially 180°. Movement of the wire 12a along this path is facilitated by rotation of the pulley, as illustrated by the arrow in FIG. 12(A).

The operation of the wire-length control mechanism in case of a lack of tension in the Bowden cable arrangement 10a is illustrated in FIGS. 12(A) and (B). Again, an excessive length of the wire 12a, which is not pulled into the sheath of the Bowden cable arrangement 10a, forms a loop extending outwardly from the pulley 75'. In this way, the excessive length of the wire 12a is absorbed in a controlled way.

Figure 13A:
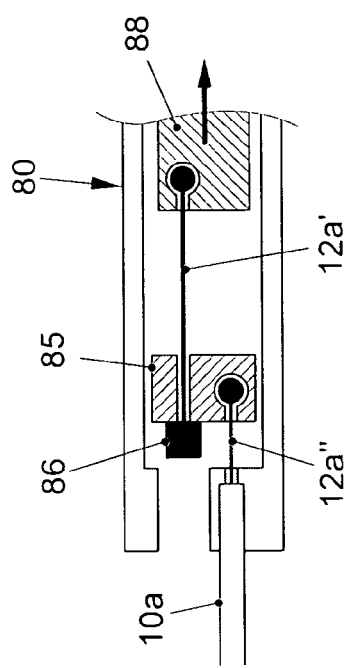
FIGS. 13(A) and (B) schematically illustrate a wire-length control mechanism according to a further embodiment of the invention.

In FIGS. 13(A) and (B), a wire-length control mechanism according to a further embodiment of the invention is illustrated. Again, the wire-length control mechanism is implemented within an actuator 80, which may be similar to the actuator 50 of FIG. 9.

The actuator 80 comprises a slide member 88 which is slidable with respect to a housing. The wire of the Bowden cable arrangement 10a is separated into a first portion 12a' and a second portion 12a". A further slide member 85 is provided, which is slidable in substantially the same direction as the slide member 88. The first portion of the wire 12a' is coupled to the slide member 88 and is slidably coupled to the further slide member 85, e.g. by being received within a channel of the further slide member. A sliding movement of the first portion of the wire 12a' with respect to the further slide member 85, when moving the slide member 88 and the further slide member 85 away from each other, is limited by a stop member 86. The second portion of the wire 12a" is coupled to the further slide member 85. The sheath of the Bowden cable arrangement 10a is fixed to the housing.

In FIG. 13(A), a situation is illustrated in which there is tension on the Bowden cable arrangement 10a. In this situation, the stop member 86 limits a further sliding movement of the first portion of the wire 12a' with respect to the further slide member 85, and a tractive force is transmitted from the slide member 88 to the further slide member 85 via the first portion of the wire 12a' when moving the slide member in the direction of the arrow in FIG. 13(A). From the further slide member 85, the tractive force is transmitted to the second portion of the wire 12a", thereby tensioning the Bowden cable arrangement 10a.

Figure 13B:
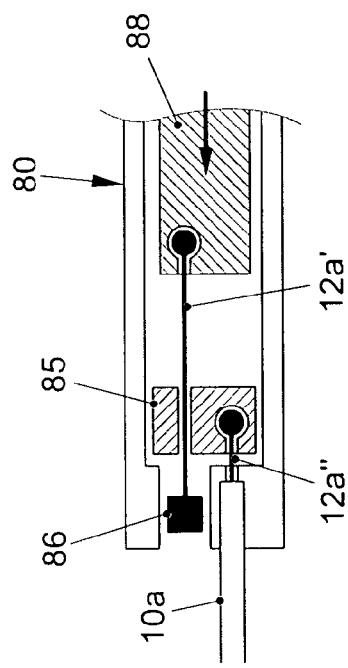

In FIG. 13(B), a situation is illustrated in which there is a lack of tension on the Bowden cable arrangement 10a. In this situation, the stop member 86 does not limit a sliding movement of the first portion of the wire 12a with respect to the further slide member 85, and the slide member 88 and the further slide member 85 are effectively decoupled from each other. If the slide member 88 moves in the direction of the arrow in FIG. 13(B), the first portion of the wire 12a' slides with respect to the further slide member 85, and the excessive wire length is absorbed in an outward direction. For this purpose, the housing may be provided with a guide channel for the stop member 86, as schematically illustrated in FIGS. 13(A) and (B).

As can be seen from FIGS. 13(A) and (B), an excessive wire length due to a lack of tension in the Bowden cable arrangement 10a is absorbed in a controlled way.

Figures 14A, 14B:
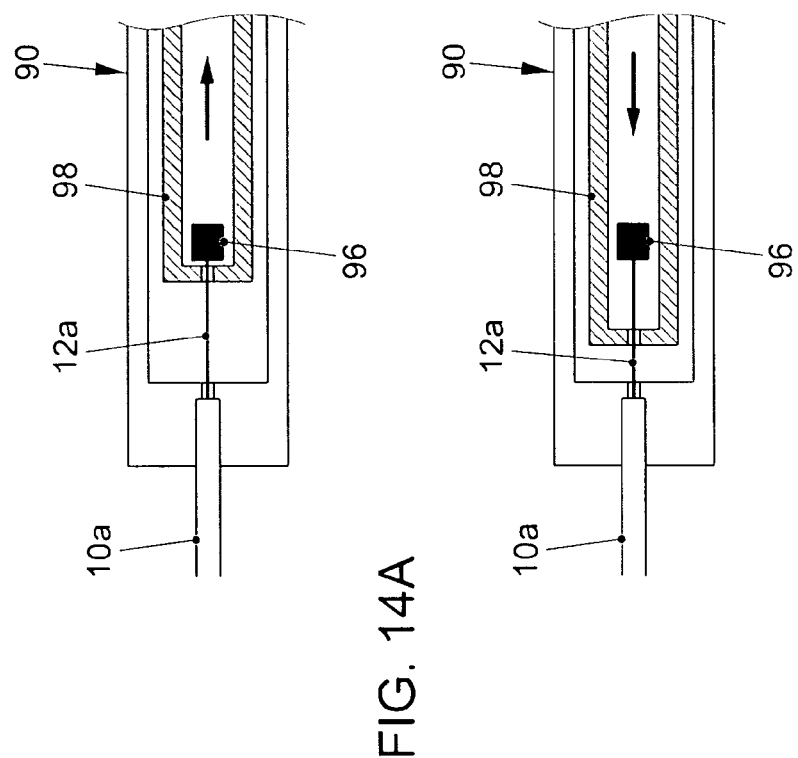
FIGS. 14(A) and (B) schematically illustrate a wire-length control mechanism according to a further embodiment of the invention.

In FIGS. 14(A) and (B), a wire-length control mechanism according to a further embodiment of the invention is illustrated. Again, the wire-length control mechanism is implemented within an actuator 90, which may be similar to the actuator 50 of FIG. 9.

As illustrated in FIGS. 14(A) and (B), the actuator 90 comprises a slide member 98, which is slidable with respect to a housing. The wire 12a of the Bowden cable arrangement 10a is coupled to the slide member 98, and the sheath of the Bowden cable arrangement 10a is fixed to the housing.

As further illustrated, said coupling of the wire 12a to the slide member 98 is accomplished in a slidable manner, e.g. by receiving the wire 12a in a channel of the slide member 98. The sliding movement of the wire 12a away from the slide member 98 is limited by a stop member 96, In FIG. 14(A), a situation is illustrated in which there is tension on the Bowden cable arrangement 10a. In this situation, a sliding movement of the wire 12a with respect to the slide member 98 is limited by the stop member 96. Accordingly, when moving the slide member 98 in the direction indicated by the arrow in FIG. 14(A), a tractive force is transmitted to the wire 12a, thereby increasing the tension on the Bowden cable arrangement 10a.

In FIG. 14(B), a situation is illustrated in which there is a lack of tension on the Bowden cable arrangement 10a. In this case, the sliding movement of the wire 12a with respect to the slide member 98 in not limited by the stop member 96. In particular, when the slide member 98 is moved into the direction indicated by the arrow in FIG. 14(B), the wire 12a slides with respect to the slide member 98 and an excessive length of the wire 12a, which is not pulled into the sheath of the Bowden cable arrangement 10a, is effectively absorbed. As illustrated, the slide member 98 may be provided with an interior guide channel for the stop member 96. In this case, the excessive wire length is absorbed in a controlled way within the slide member 98.

Although the wire-length control mechanisms of FIGS. 11-14 each have been illustrated as being implemented within an actuator, it is to be understood that they could also be implemented in other actuators, e.g. the actuators 20, 30, 40, 50 of FIGS. 1-9, or as separate components, e.g. by indirectly coupling the illustrated slide members to the actuator via a Bowden cable arrangement. Further, it is to be understood that the illustrated wire-length control mechanisms may be provided for either one of the first Bowden cable arrangement and the second Bowden cable arrangement, or for both Bowden cable arrangements. Further, it is to be understood that the wire-length control mechanisms of FIGS. 10-14 could also be combined with each other, e.g. in order to increase the excessive wire length which can be absorbed.

Figure 15B:
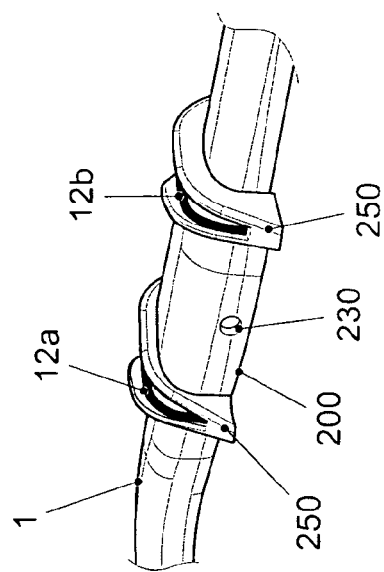
FIGS. 15(A) and (B) schematically illustrate a connecting structure for connecting a wire end of a Bowden cable arrangement to a seat frame, according to an embodiment of the invention.
Figure 15A:
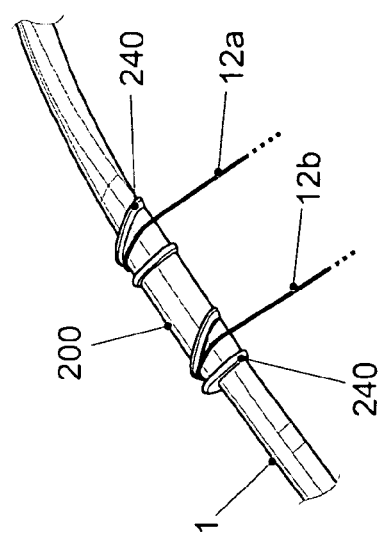

In FIGS. 15(A) and (B) a connecting structure of the wires 12a, 12b of the first and second Bowden cable arrangements 10a, 10b with respect to the seat frame 1 is illustrated. FIGS. 15(A) and (B) illustrate different perspective views of the connection structure. According to the illustrated embodiment, a connecting piece 200, which is formed from a plastic material, is attached to the seat frame 1. The connecting piece 200 comprises dedicated structures for receiving the ends of the wires 12a, 12b. As further illustrated, guide channels 240 are formed on the connecting piece 200 for guiding the wire 12a, 12b along an outer surface of the connecting piece 200. As illustrated, the guide channels 240 may be provided with a tapering shape, thereby increasing the flexibility with respect to different configurations of the support assembly, e.g. in different types of seats. The connecting piece 200 may be attached to the seat frame 1 by using a screwed connection through a hole 230. Other types of connection, e.g. clamping, gluing or the like, are also possible. Using the connection piece on the one hand facilitates installation of the support assembly with respect to the seat frame and increases the reliability of connection. On the other hand, the guide channels 240 have a similar effect as the guide surface 75 explained in connection with FIG. 10, e.g. an excessive length of the wires 12a, 12b may be absorbed in a controlled way by forming a loop extending from the outer surface of the connecting piece 200.

In FIGS. 15(A) and (B), a single connecting piece 200 for both wires 12a, 12b is illustrated. In other embodiments, a separate connecting piece may be provided for each of the wires 12a, 12b. The connecting piece 200 may be combined with the wire-length control mechanisms of FIGS. 10-14.

Further, it is also preferable to provide the actuators of FIGS. 5, 8, and 9 with a self-blocking capability, e.g. by using a worm gear as in the actuator 20 of the first and second embodiments.

Figure 16:
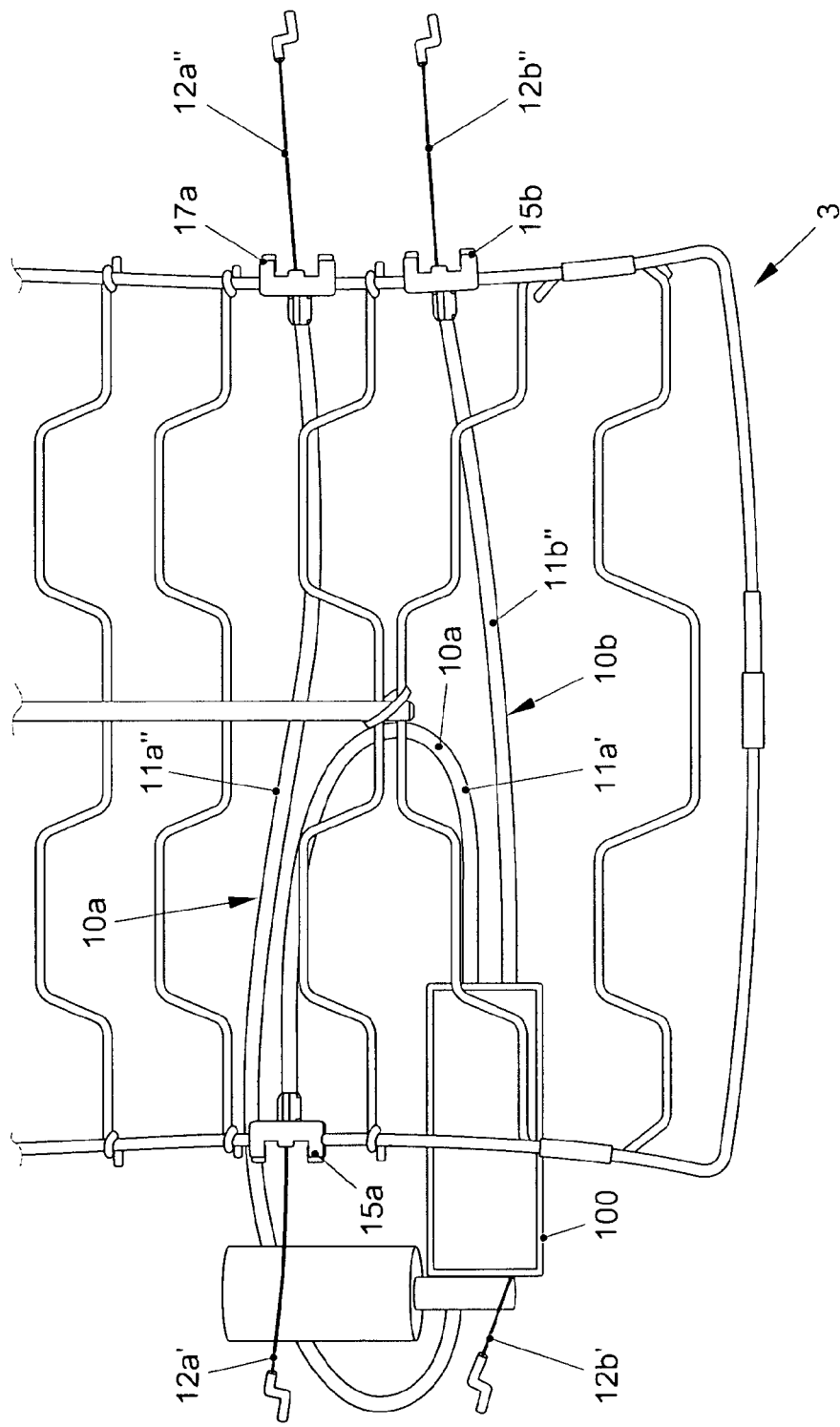
FIG. 16 shows a support assembly according to a fifth embodiment of the invention.

FIG. 16 schematically illustrates a support assembly according to a further embodiment of the invention. The support assembly is similar to those as described above, and similar components have been designated with the same reference numerals. In the following, only the differences as compared to the above described support assemblies will be explained.

In the support assembly of FIG. 16, an actuator 100 is attached to the support member 3. As illustrated, the actuator 100 is attached to the support member 3 at one side of the support member, thereby allowing for an efficient packaging of the support assembly in a seat structure.

Again, the support assembly comprises a first Bowden cable arrangement 10a and a second Bowden cable arrangement 10b. The first Bowden cable arrangement 10a comprises a first sheath 11a' extending from the actuator toward one side of the support member 3 in the first support region. The Bowden cable arrangement 10a further comprises a second sheath 11a" which extends from the actuator 100 to the opposite side of the support member 3. The first sheath 11a' is attached to the side of the support member 3 by means of a first attachment means 15a. The second sheath 11a" is attached to the opposite side of the support member 3 by means of a second attachment means 17a. The second Bowden cable arrangement 10b comprises a sheath 11b" which, with respect to the attachment position of the actuator 100, extends to the opposite side of the support member 3, where it is attached to the support member 3 by means of a third attachment means 15b in the second support region. In the first support region, a wire 12a' extends from the first sheath 11a' at the first attachment means 15a, and a wire 12a" extends from the second sheath 11a" at the second attachment means 17a. In the second support region, a wire 12b" extends from the sheath 11b" at the third attachment means 15b, and a wire 12b' extends directly from the actuator 100. The wires 12a', 12a", 12b', 12b" have the purpose of coupling the support member 3 to the seat frame (not illustrated), so as to adjust the degree of support as explained above. Again, coupling to the seat frame may be accomplished by means of Z-nipples or by means of a connecting structure as illustrated in FIG. 15.

Figure 17A:
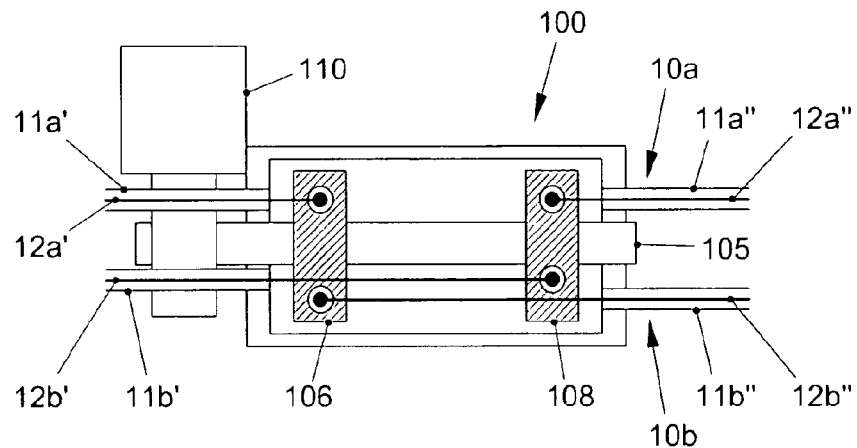
FIGS. 17(A), (B), and (C) schematically illustrate an actuator as used in the embodiment of FIG. 16.
Figure 17B:
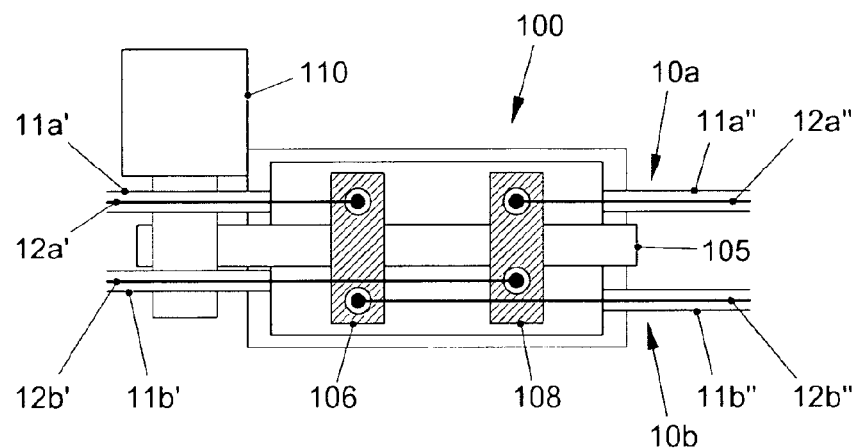
Figure 17C:
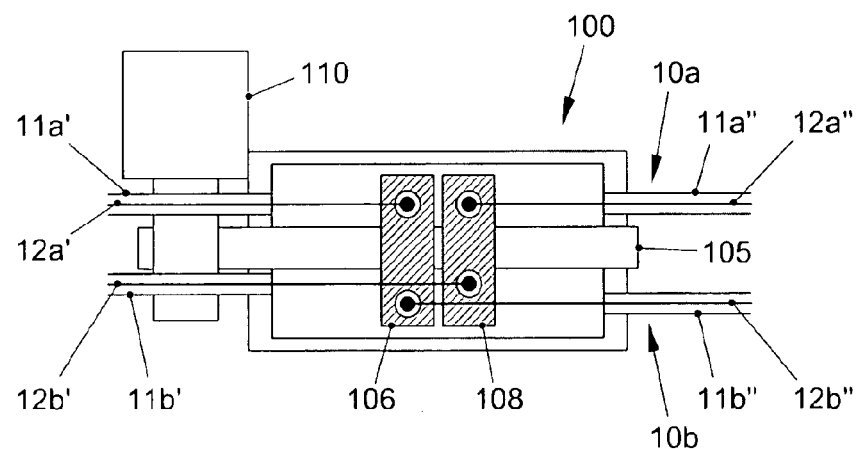

FIGS. 17(A), 17(B), and 17(C) schematically illustrate the structure and operation of the actuator 100 as used in the support assembly of FIG. 16. Although in FIGS. 17(A)-(C) the second Bowden cable arrangement 10b is illustrated to comprise a first sheath 11b' and a second sheath 11b", it is to be understood that one of the sheaths could be omitted as illustrated in FIG. 16. Similarly, one of the sheaths could also be omitted for the first Bowden cable arrangement 10a. On the other hand, it would be possible to use two pairs of sheaths in the support assembly of FIG. 16.

As illustrated, the sheaths 11a', 11a", 11b', 11b" of the Bowden cable arrangements 10a, 10b are each coupled to a housing of the actuator 100. A first slide member 106 and a second slide member 108 are slidably coupled to the housing. One end of the wire 12a' is coupled to the first slide member 106, and one end of the wire 12a" is coupled to the second slide member 108. One end of the wire 12b" is coupled to the first slide member 106, and one end of the wire 12b' is coupled to the second slide member 108. A drive mechanism is provided for simultaneously moving the first slide member 106 and the second slide member 108 in opposite directions. For example, as illustrated, the drive mechanism may comprise a threaded shaft 105 on which the first slide member 106 and the second slide member 108 are engaged with corresponding threads.

The opposite movement directions of the first slide member 106 and the second slide member 108 may be achieved by providing the threads in the range of movement of the first slide member 106 as left-handed threads and the threads in the range of movement of the second slide member 108 as right-handed threads, or vice-versa, with corresponding mating threads on the slide members 106, 108. The threaded shaft 105 is driven by an electric motor 110, e.g. through a worm gear. By using the threaded coupling between the threaded shaft 105 and the first and second slide members 106, 108, the actuator 100 is provided with a self-blocking capability. In other embodiments, the drive mechanism for moving the first and second slide members 106, 108 in opposite directions may be implemented in a different manner. The wire 12b' may be guided along the first slide member 106 or passed through the first slide member 106, and the wire 12b" may be guided along the second slide member 108 or passed through the second slide member 108.

In FIG. 17(A), the actuator 100 is illustrated in a first position, in which the wires 12b' and 12b" are tensioned, whereas there is no tension on the wires 12a' and 12a". In FIG. 17(B), a situation is illustrated in which the first slide member 106 and the second slide member 108 have been moved closer to each other, thereby pulling the wires 12a' and 12a" and releasing tension on the wires 12b' and 12b". In the situation of FIG. 17(B), there is no significant tension on the wires 12b' and 12b", and there is no significant tension on the wires 12a' and 12a". This situation may be referred to as a neutral position of the actuator. In FIG. 17(C), a situation is illustrated in which the first slide member 106 and the second slide member 108 have been moved still closer to each other, thereby pulling on the wires 12a' and 12a" and further releasing tension on the wires 12b' and 12b". In the situation of FIG. 17(C), the wires 12a' and 12a" are tensioned, whereas there is no tension on the wires 12b' and 12b". When, starting from the situation of FIG. 17(C), the first slide member 106 and the second slide member 108 are moved away from each other so as to eventually return to the situation of FIG. 17(A), the first slide member 106 and the second slide member 108 pull on the wires 12b' and 12b", and the tension on the wires 12a' and 12a" is released.

In order to improve the characteristics in a situation when there is low or no tension on one of the Bowden cable arrangements 10a, 10b, the actuator 100 may be combined with a wire-length control mechanism as illustrated in FIGS. 10-14.

Figure 18:
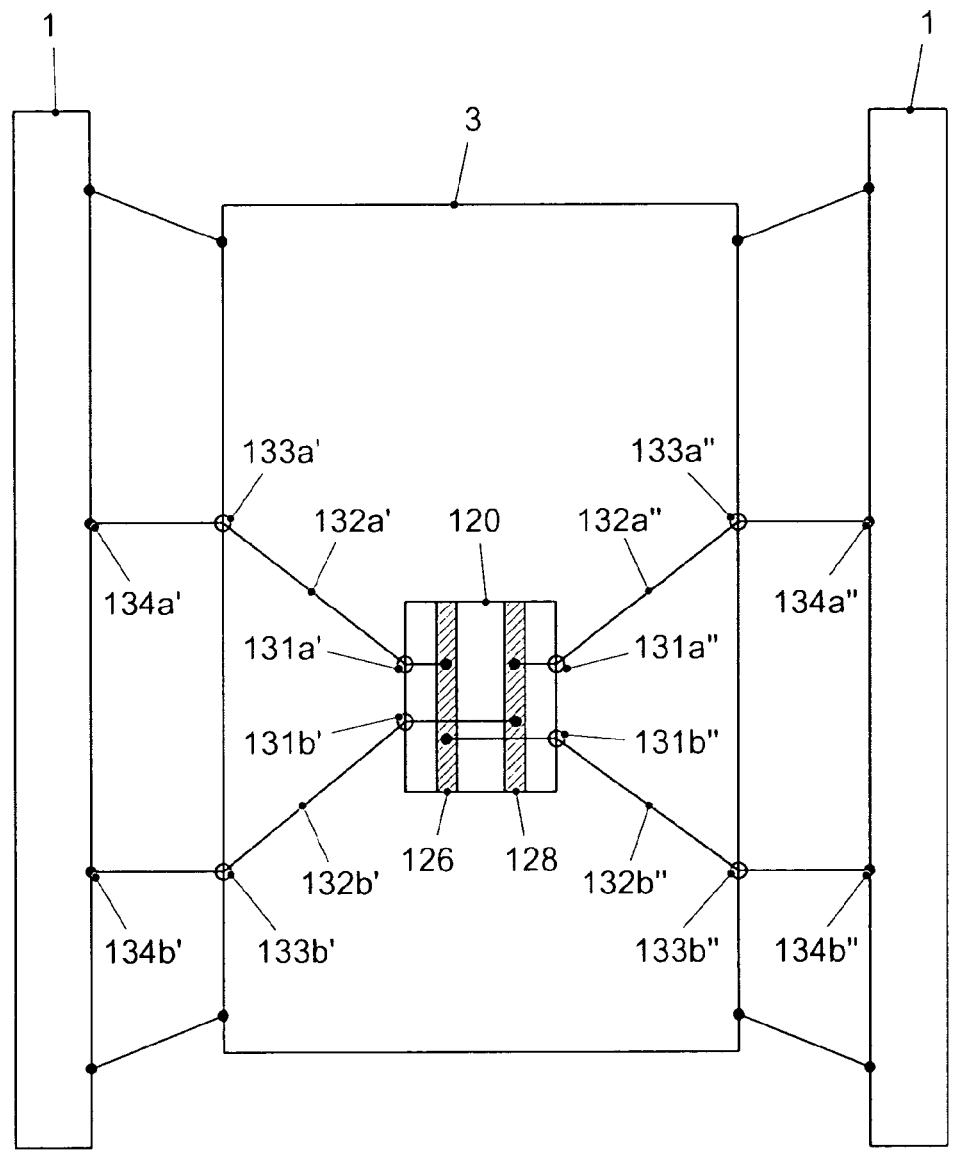
FIG. 18 shows a support assembly according to a sixth embodiment of the present invention.

FIG. 18 schematically illustrates a support assembly according to a further embodiment of the invention. The support assembly of FIG. 18 generally corresponds to that of FIG. 16 and comprises support member 3 to be incorporated into a seat frame 1. The support member 3 may be a wire framework as described above, or any other suitable type of support member. As compared to the support assembly of FIG. 16, a different type of adjustment arrangement is used for adjusting the degree of support in the first support region and in the second support region. In particular, rather than using a first Bowden cable arrangement and a second Bowden cable arrangement, simple traction wires, without a sheath, are used.

The support assembly comprises an actuator 120 which is attached to the support member 3 in a center region thereof. The actuator 120 may operate in a similar manner as the actuator 100 of FIGS. 16 and 17. In particular, the actuator 120 may comprise a first slide member 126 and a second slide member 128 and a drive mechanism (not illustrated) for moving the first and second slide members 126, 128 in opposite directions.

As illustrated in FIG. 18, the support assembly comprises a first adjustment arrangement having a wire 132a' extending from the actuator 120 toward one side of the support member 3 in the first support region and a wire 132a" extending from the actuator 120 toward the opposite side of the support member 3 in the first support region. The actuator 120 comprises a guiding point 131a' for the wire 132a' and a guiding point 131a" for the wire 132a". Further, a guiding point 133a' for the wire 132a' is provided near the respective side of the support member 3, and a guiding point 133a" is provided for the wire 132a" near the respective side of the support member 3. The wire 132a' extends from the guiding point 133a' and is coupled to the seat frame 1 at a connection point 134a'. Similarly, the wire 132a" extends from the guiding point 133a" and is coupled to the seat frame 1 at a connection point 134a".

The second adjustment arrangement comprises a wire 132b' extending from the actuator 120 toward one side of the support member 3 in the second support region, and a wire 132b" extending from the actuator 120 toward the opposite side of the support member 3 in the second support region. The actuator 120 comprises a guiding point 131b' for the wire 132b' and a guiding point 131b" for the wire 132b". Further, a guiding point 133b' for the wire 132b' is provided near the respective side of the support member 3, and a guiding point 133b" for the wire 132b" is provided near the respective side of the support member 3. The wire 132b' extends from the guiding point 133b' and is coupled to the seat frame 1 at a connection point 134b', and the wire 132b" extends from the guiding point 133b" and is coupled to the seat frame 1 at a connection point 134b".

Coupling of the wires 132a', 132a", 132b', 132b" to the seat frame may be accomplished as described above, e.g. by means of a Z-nipple or by means of a connecting structure as illustrated in FIG. 15.

Figure 19A:
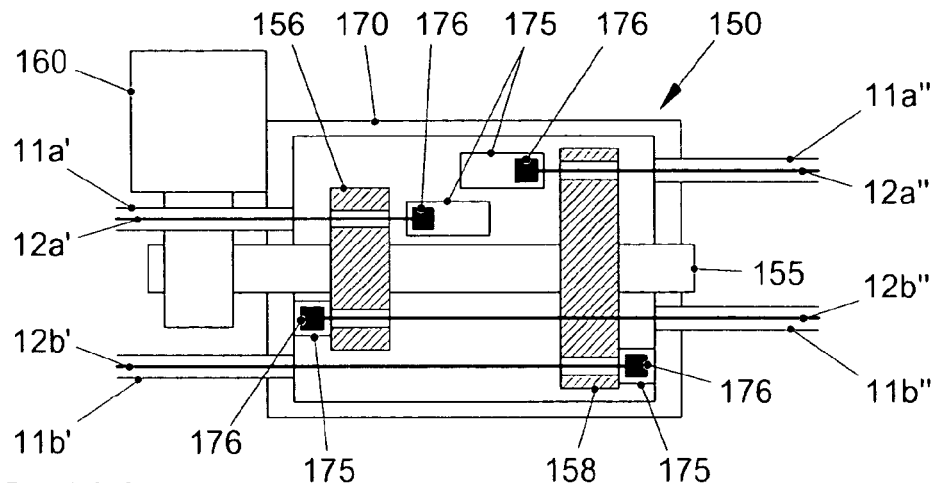
FIGS. 19(A). (B), and (C) schematically illustrate a further actuator according to an embodiment of the invention, which incorporates a wire-length control mechanism.
Figure 19B:
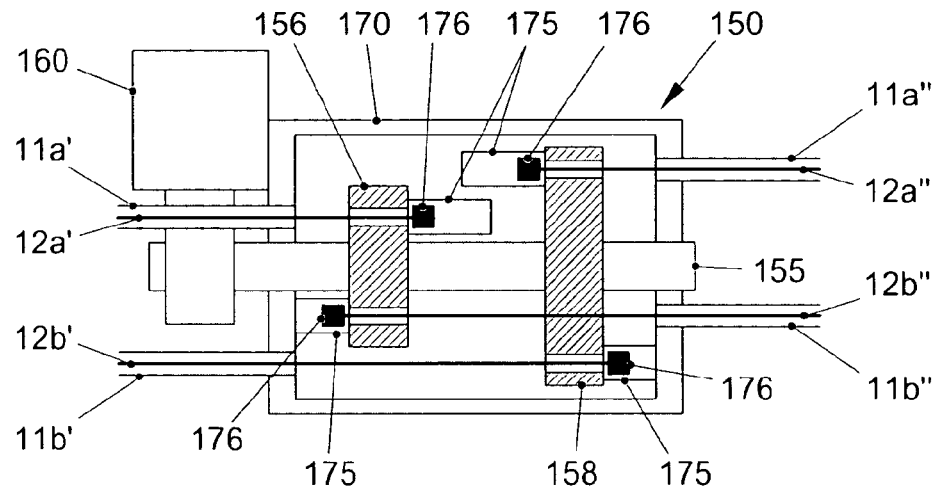
Figure 19C:
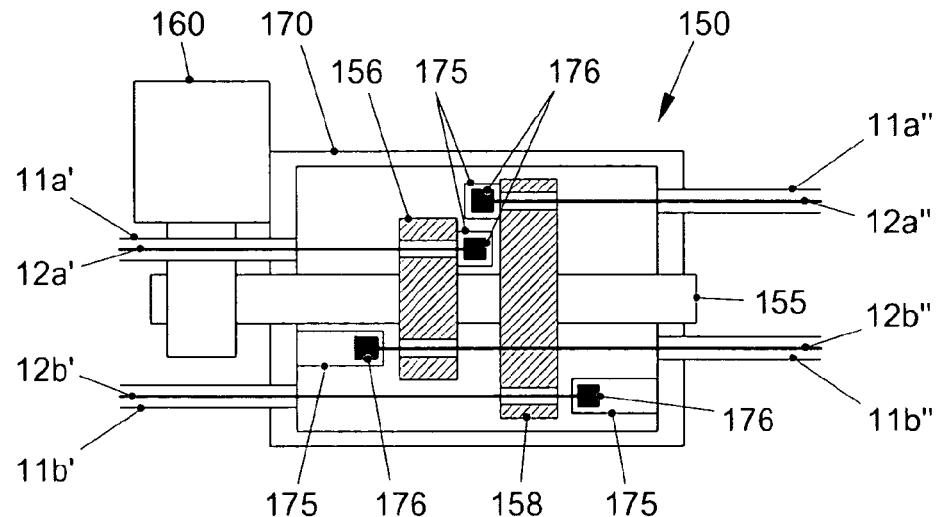

FIGS. 19(A), 19(B), and 19(C) schematically illustrate the structure and operation of an actuator 150 according to a further embodiment of the invention. The actuator is similar to that as illustrated in FIG. 17(A), 17(B), and 17(C) and may be used in a support assembly as illustrated in FIG. 16. However, the actuator 150 may also be used in other support assemblies, e.g. as described herein. Although in FIGS. 17(A)-(C) the second Bowden cable arrangement 10b is illustrated to comprise a first sheath 11b' and a second sheath 11b", it is to be understood that one of the sheaths could be omitted as illustrated in FIG. 16. Similarly, one of the sheaths could be omitted for the first Bowden cable arrangement 10a.

As illustrated, the sheaths 11a', 11a', 11b', 11b" of the Bowden cable arrangements 10a, 10b are each coupled to a housing 170 of the actuator 150. A first slide member 156 and a second slide member 158 are slidably coupled to the housing. One end of the wire 12a' is slidably guided through the first slide member 156, and one end of the wire 12a" is slidably guided through the second slide member 158. One end of the wire 12b" is slidably guided through the first slide member 156, and one end of the wire 12b' is slidably guided through the slide member 158. For each of the wires 12a', 12a", 12b', 12b", a stop member 176, e.g. in the form of a nipple, is attached to the respective end of the wire so as to limit a sliding movement of the wire with respect to the slide member. Due to this arrangement, the slide members 156, 158 can only transmit forces to the wires 12a', 12a", 12b', 12b" in a single direction, i.e. tractive forces. A pushing action is not possible as the sliding movement of the wire with respect to the slide member prevents the transmission of forces. In this way, a wire-length control mechanism is implemented within the actuator 150.

As further illustrated, the actuator 150 further comprises abutment means 175 for each of the stop members 176. The abutment means 175 are formed as guide channels in the housing 170. That is to say, at least portion of the stop members 176 extends through the respective guide channel, thereby limiting the sliding movement of the stop member 176 with respect to the housing 170. In particular, this allows for preventing the support in one of the support regions going into negative direction when there is low or no tension on the respective wire.

The actuator 150 further comprises a drive mechanism for simultaneously moving the first slide member 156 and the second slide member 158 in opposite directions. For example, the drive mechanism may comprise a threaded shaft 155 on which the first slide member 156 and the second slide member 158 are engaged with mating threads. The opposite movement directions of the first slide member 156 and the second slide member 158 may be achieved by providing the threads in the range of movement of the first slide member 156 as left-handed threads and the threads in the range of movement of the second slide member 158 as right-handed threads, or vice-versa, with corresponding mating threads on the slide members 156, 158. The threaded shaft 155 is driven by an electric motor 160, e.g. through a worm gear. By using the threaded coupling between the threaded shaft 155 and the first and second slide members 156, 158, the actuator 150 is provided with a self-blocking capability. In other embodiments, the drive mechanism for moving the first and second slide members 156, 158 in opposite directions may be implemented in a different manner. As further illustrated, the actuator 150 is configured in such a way that the wire 12b' passes by the first slide member 156 and the wire 12b" is guided along the second slide member 158. In other embodiments, the wire 12b' could be passed through the first slide member 156, and the wire 12b" could be passed through the second slide member 158. Further, it is to be understood that a wire-length control capability is also achieved when omitting the abutment means 175. Further, the abutment means 175 could be implemented in a different manner, e.g. by projections extending from the housing 170.

In FIG. 19(A), the actuator 150 is illustrated in a first position, in which the wires 12b' and 12b" are tensioned, whereas there is low tension on the wires 12a' and 12a". The tension on the wires 12a' and 12a" is prevented from further decreasing by abutment of the stop members 176 of the wires 12a' and 12a" on the respective abutment means 175. In FIG. 19(B) a situation is illustrated in which the first slide member 156 and the second slide member 158 have been moved closer to each other, thereby pulling the wires 12a' and 12a" and releasing tension on the wires 12b' and 12b". The situation of FIG. 19(B) may be referred to as a neutral position of the actuator 150. In FIG. 19(C), a situation is illustrated in which the first slide member 156 and second slide member 158 have been moved still closer to each other, thereby pulling the wires 12a' and 12a" and further releasing tension on the wires 12b' and 12b". In the situation of FIG. 19(C), the wires 12a' and 12a" are tensioned, whereas there is low tension on the wires 12b' and 12b". The tension in the wires 12b' and 12b" is prevented from further decreasing by abutment of the stop members 176 of the wires 12b', 12b" on the respective abutment means 175. When starting from the situation of FIG. 19(C), the first slide member 156 and the second slide member 158 are moved away from each other so as to eventually return to the situation of FIG. 19(A), the first slide member 156 and the second slide member 158 pull on the wires 12b' and 12b", and the tension on the wires 12a' and 12a" is released.

Figure 20:
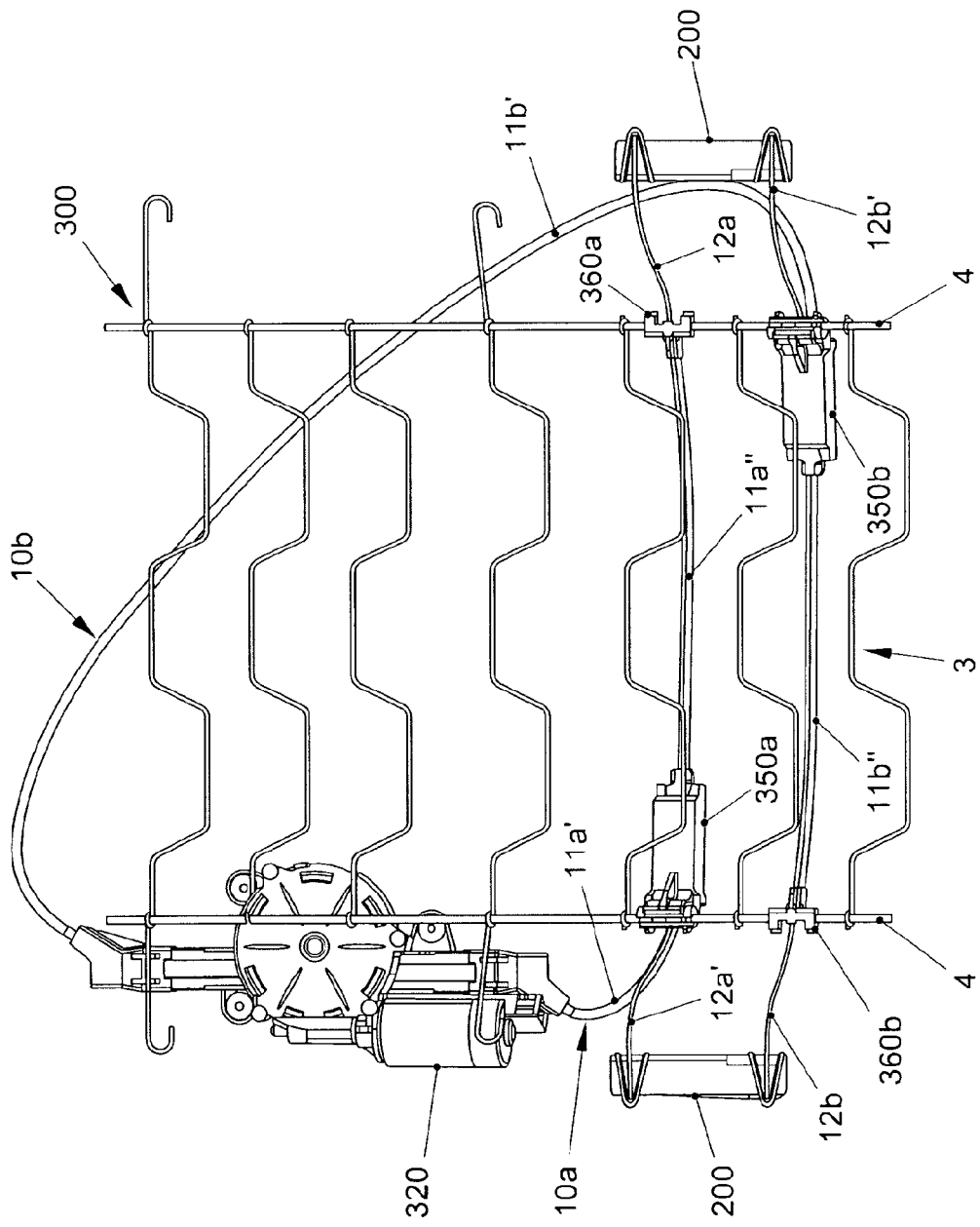
FIG. 20 shows a support assembly according to a seventh embodiment of the present invention.

FIG. 20 shows a support assembly 300 according to a further embodiment of the invention. The support assembly of FIG. 20 is similar to that of FIG. 1 and comprises a support member 3 to be incorporated into a seat frame (not illustrated in FIG. 20). The support member 3 may be a wire framework as described above, or any other suitable type of support member. As compared to the support assembly of FIG. 1, a different type of Bowden cable arrangement is used for adjusting the degree of support in the first support region and in the second support region. Further, a connecting structure as illustrated in FIG. 15 is used for connecting wire ends to the seat frame, rather than using Z-nipples as explained in connection with FIG. 1.

As illustrated, the support assembly 300 comprises an actuator 320 which acts, in opposite directions, on a first Bowden cable arrangement 10a and on a second Bowden cable arrangement 10b. For each of the Bowden cable arrangements 10a, 10b, the actuator 320 is implemented with a wire-length control mechanism as schematically illustrated in FIG. 13.

In the support assembly 300, the first Bowden cable arrangement 10a comprises a wire 12a guided in a sheath. The sheath comprises a first portion 11a' extending from the actuator to a first cable-splitting member 350a (or cable-splitting means), and a second portion 11a" extending from the cable-splitting member 350a to an attachment member 360a. The first cable-splitting member 350a is attached to one side of the support member 3 via a clip portion. As illustrated, the clip portion is attached to the respective side wire 4 of the support member 3. A further wire 12a' of the first Bowden cable arrangement 10a extends from the cable-splitting member 350a and is attached to the seat frame in the first support region. The attachment member 360a is attached to the support member 3 at the opposite side with respect to the first cable-splitting member 350a. As illustrated; the attachment member 360a is clipped to the respective side wire 4 of the support member 3. The wire 12a of the first Bowden cable arrangement 10a extends from the actuator 320 through the first portion 11a' of the sheath, through the first cable-splitting member 350a, and through the second portion 11a" of the sheath, extends from the attachment member 360a and is attached to the seat frame in the first support region.

The second Bowden cable arrangement 10b has a similar configuration. A sheath of the second Bowden cable arrangement 10b comprises a first portion 11b' extending from the actuator 320 to a second cable-splitting member 350b (or cable-splitting means), and a second portion 11b" extending from the second cable-splitting member 350b to a second attachment member 360b. The second cable-splitting member comprises a clip portion for attachment of the second cable-splitting member 350b to one side of the support member 3, e.g. to the respective side wire 4. The second attachment member 360b is attached to the support member 3 at the opposite side with respect to the second cable-splitting member 350b. In particular, the second attachment member 360b is clipped to the respective side wire 4. The wire 12b of the second Bowden cable arrangement 10b extends from the actuator 320 through the first portion 11b' of the sheath, through the second cable-splitting member 350b, and through the second portion 11b" of the sheath, and extends from the second attachment member 360b so as to be attached to the seat frame in the second support region. A further wire 12b' of the second Bowden cable arrangement 10b extends from the second cable-splitting member 350b so as to be attached to the seat frame in the second support region.

As illustrated, the second cable-splitting member 350b is arranged on the opposite side of the support member 3 with respect to the first cable-splitting member 350a. Accordingly, the first Bowden cable arrangement 10a and the second Bowden cable arrangement 10b are routed to the support member 3 at opposite sides thereof. This allows for an efficient usage of space and for a simplified routing of the Bowden cable arrangements 10a, 10b. The sheathed portions of the Bowden cable arrangements 10a, 10b are each provided with a uniform curvature. In particular, in the region of the first portions of the sheaths 11a', 11b', only a single smooth curvature of the sheath is provided. In the region of the second portions of the sheaths 11a", 11b", the Bowden cable substantially extends in only one direction, which means that there is substantially no curvature. By this means, the support assembly 300 is provided with a good durability with respect to the number of cycles of adjusting the degree of support.

Figure 21:
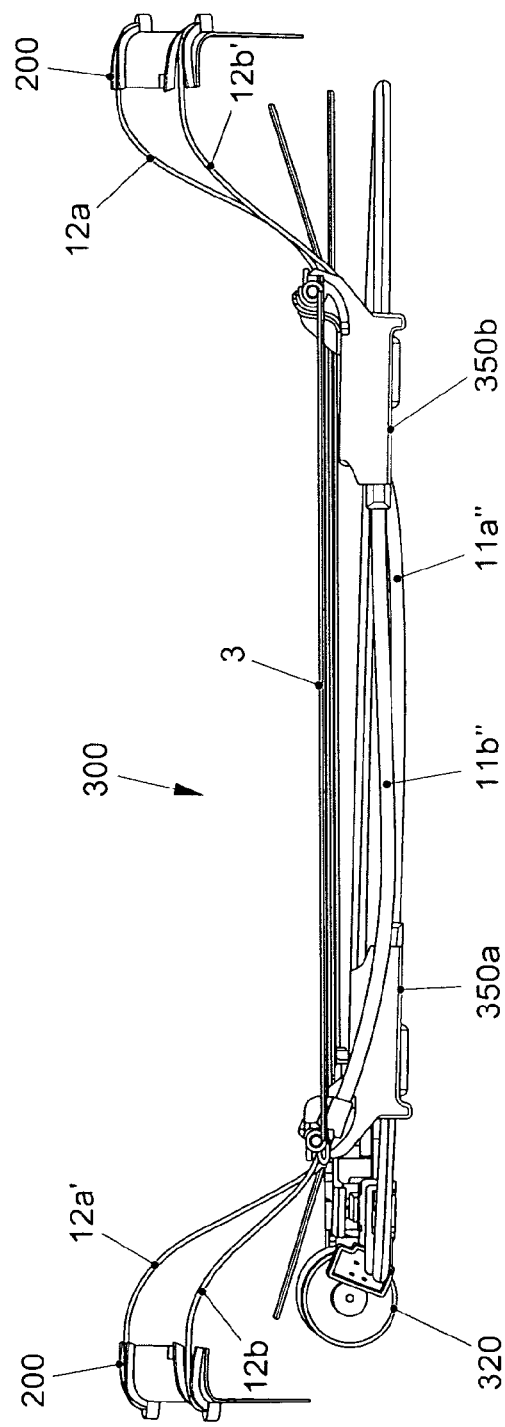
FIG. 21 shows a bottom view of the support assembly of FIG. 20.

In FIG. 21, a bottom view of the support assembly 300 is shown. As illustrated, the second portions of the sheaths 11a", 11b" are routed in an almost straight manner, resulting in a uniform curvature with no abrupt bendings.

Figure 22:
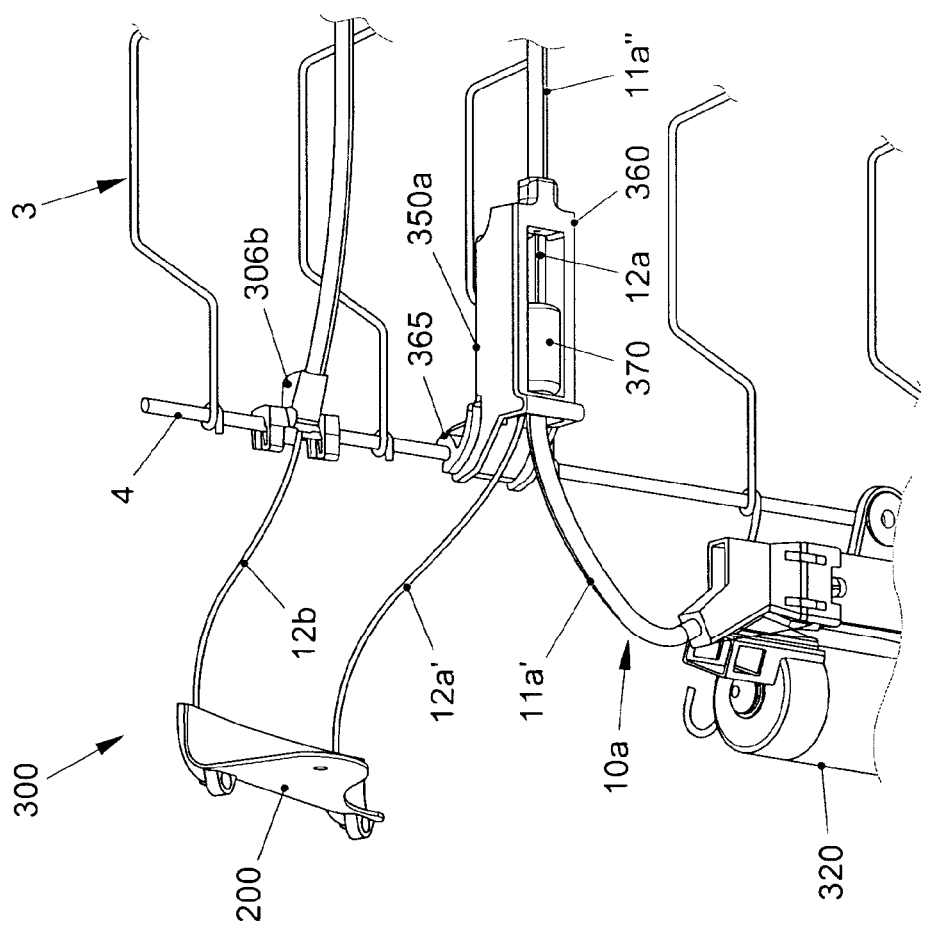
FIG. 22 shows a more detailed view of a cable-splitting member in the support assembly of FIG. 20.

FIG. 22 shows in further detail the portion of the support assembly 300. In particular, the first cable-splitting member 350a is illustrated. As can be seen, the first cable-splitting member 350a comprises a housing 360, which constitutes a fixed member, and a slide member 370 which is slidably coupled to the housing 360. In particular, the slide member 370 is received within a guide channel of the housing 360. The first portion 11a' of the sheath of the first Bowden cable arrangement 10a is connected to the slide member 370. The second portion 11a" of the sheath of the first Bowden cable arrangement 10a is connected to the housing 360. From the slide member 370, the wire 12a of the first Bowden cable arrangement 10a extends through the housing 360 to the second portion 11a" of the sheath. As further illustrated, a first cable-splitting member 350a comprises a clip portion 365 for attaching the first cable-splitting member 350a to the side wire 4 of the support member 3. The further wire 12a' extends from the first cable-splitting member 350a and is coupled to the seat frame (not illustrated) via the connecting piece 200.

Figure 23:
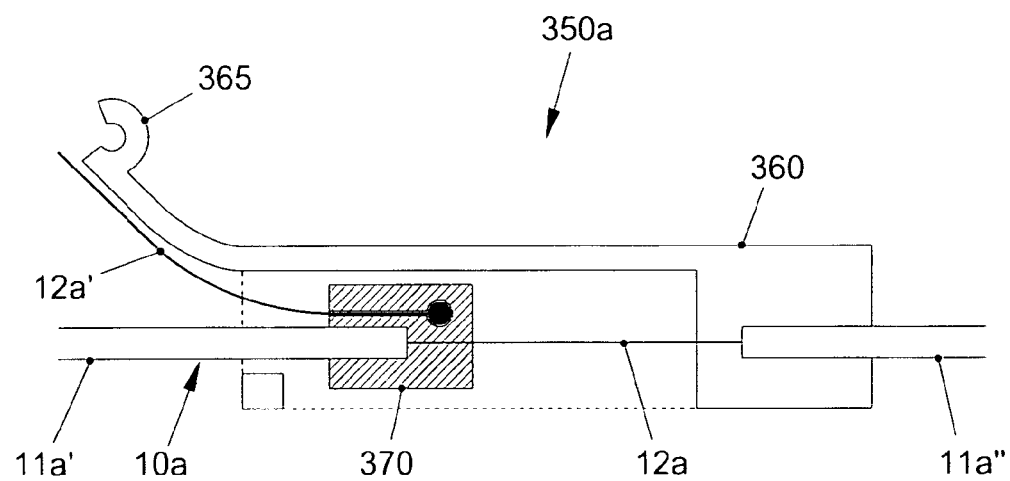
FIG. 23 shows a schematic sectional view of a cable-splitting member as used in the support assembly of FIG. 20.

FIG. 23 shows a schematic sectional view of the first cable-splitting member 350a. As illustrated, the wire 12a of the Bowden cable arrangement 10a extends from the first portion 11a' of the sheath through the slide member 370 and through the housing 360 to the second portion 11a" of the sheath. When increasing the tension in the Bowden cable arrangement 10a, the first portion 11a' of the sheath and the slide member 370 connected thereto are moved toward the second portion 11a" of the sheath. When the tension in the Bowden cable arrangement 10a is decreased, the first portion 11a' of the sheath and the slide member 370 connected thereto are moved away from the second portion 11a" of the sheath. Due to this movement, forces are transmitted to the further wire 12a' connected to the slide member 370. In this way, the cable-splitting member 350a allows for symmetrically distributing tensile forces to the wires 12a, 12a". The wire 12a' is guided along a curved guide surface of the housing 360. The curved guide surface is integrally formed with the clip portion 365.

The second cable-splitting member 350b has the same configuration as described above for the first cable-splitting member 350a, the first Bowden cable arrangement 10a, the first and second portions 11a', 11a" of the sheath, and the wires 12a, 12a' being replaced by the second Bowden cable arrangement 10b, the first and second portions 11b', 11b" of the sheath, and the wires 12b, 12b' respectively.

As can be seen, the first and second cable-splitting members 350a, 350b accomplish both the function of equally distributing forces to a pair of wires and of attaching portions of the sheath of the Bowden cable arrangement to the support member 3. This simplifies the overall construction and improves durability, in particular in view of the number of cycles of adjusting the degree of support.

Figure 24:
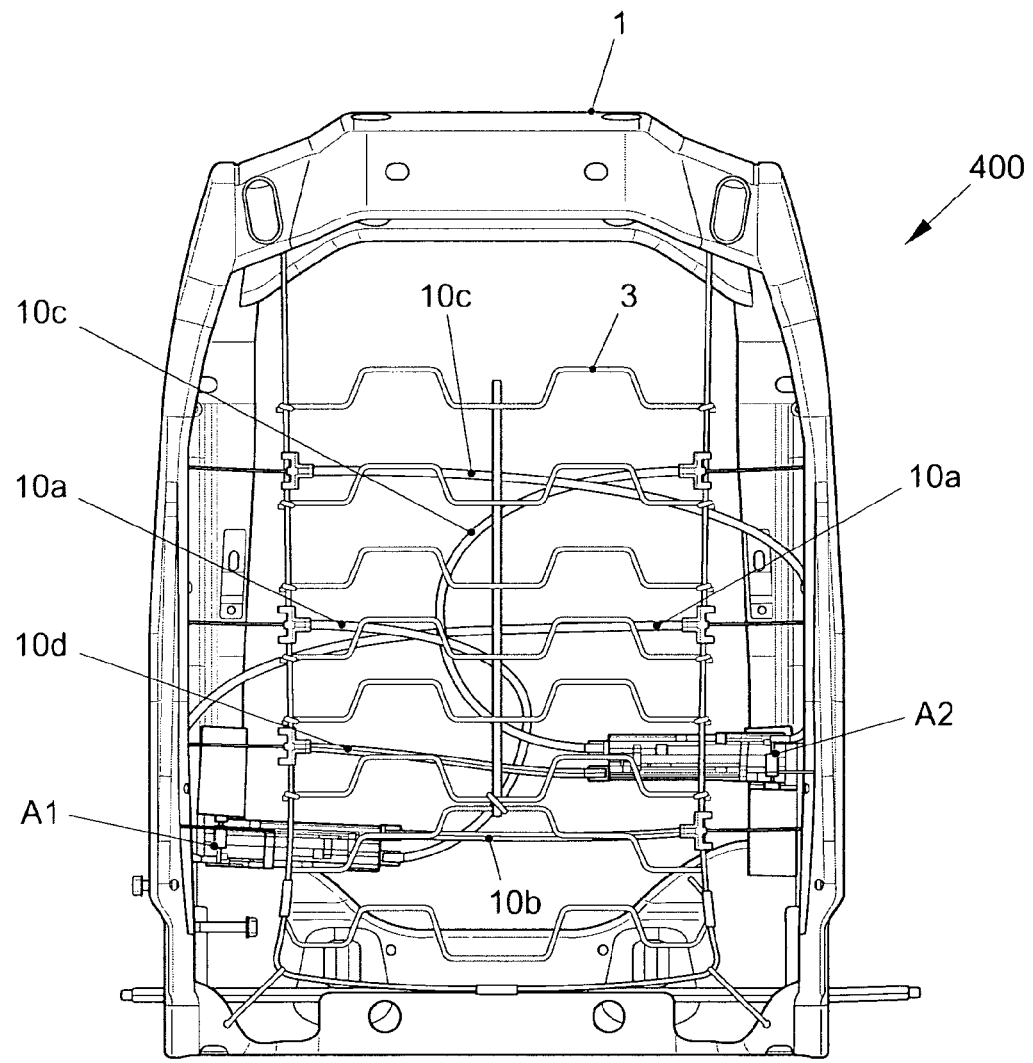
FIG. 24 shows a support assembly according to an eighth embodiment of the invention.

FIG. 24 schematically illustrates a support assembly according to a still further embodiment of the invention. The support assembly 400 may be based on any of the above-described support assemblies. The support assembly comprises a first actuator A1 which acts, in opposite directions, on a first Bowden cable arrangement 10a and on a second Bowden cable arrangement 10b for adjusting the degree of support in a first support region and in a second support region, and a second actuator A2 which acts, in opposite directions, on a third Bowden cable arrangement 10c and on a fourth Bowden cable arrangement 10d for adjusting the degree of support in a third support region an a fourth support region. The actuators A1, A2 are attached to the support member 3 at opposite sides thereof, thereby allowing for a highly efficient use of the available space. The actuators A1, A2 correspond to the actuator 150 as explained in connection with FIG. 19.

Figure 25A:
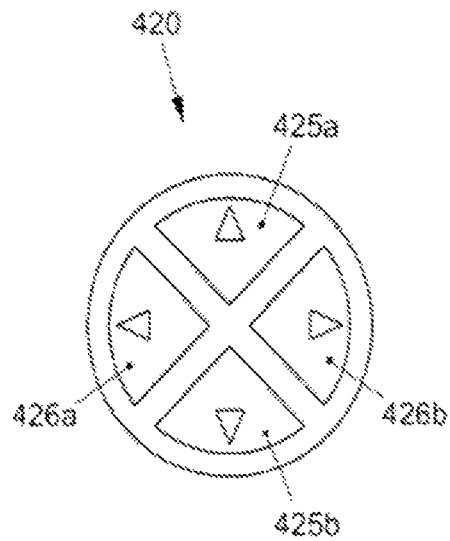
FIGS. 25(A) and (B) schematically illustrate the operating principles of the support assembly of FIG. 24 when statically adjusting the degree of support.

FIGS. 25(A) and (B) schematically illustrate operations of the support assembly 400 with respect to statically adjusting the degree of support. For this purpose, the support assembly 400 comprises an electronic controller coupled to the actuators A1, A2 for controlling operations thereof, and a first control element 420. The first control element 420 is provided for controlling the static position of lumbar support, i.e. the height of support and the degree of support.

Figure 25B:
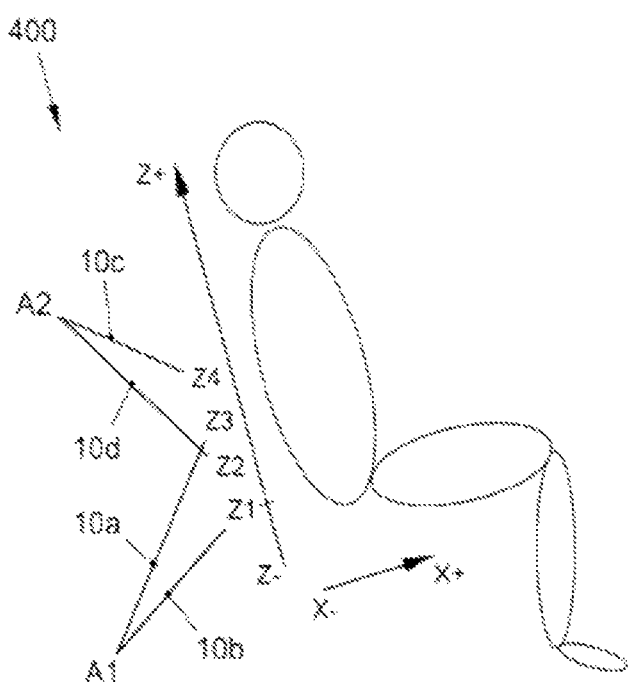

In FIG. 25(B), the first support region and the second support region are denoted by Z3 and Z1, respectively, and the third support region and the fourth support region are denoted by Z4 and Z2, respectively. That is to say, the first to fourth support regions correspond to different vertical zones of the support assembly. As illustrated, the first zone (zone 1, Z1) is at the lowest vertical position, the second zone (zone 2, Z2) is above the first zone, the third zone (zone 3, Z3) is above the second zone, and the fourth zone (zone 4, Z4) is above the third zone. The first actuator A1 is coupled to the first Bowden cable arrangement 10a and to the second Bowden cable arrangement 10b for adjusting the degree of support in the first zone Z1 and in the third zone Z3. The second actuator A2 is coupled to the third Bowden cable arrangement 10c and to the fourth Bowden cable arrangement 10d for adjusting the degree of support in the second zone Z2 and in the fourth zone Z4. As described above, the first actuator A1 is configured to act on the first Bowden cable arrangement 10a and the second Bowden cable arrangement 10b in opposite directions, and the second actuator A2 is configured to act on the third Bowden cable arrangement 10c and on the fourth Bowden cable arrangement 10d in opposite directions.

A wire-length control mechanism may be implemented within the first and/or second actuator A1, A2, as explained in connection with FIG. 19.

The control element 420 comprises buttons 425a and 425b for shifting the position of lumbar support between the first zone Z1 and the fourth zone Z4. In particular, when pressing the button 425a, the position of lumbar support is shifted upward toward the fourth zone Z4, and when pressing the button 425b, the position of lumbar support is shifted downward toward the first zone Z1. Further, the control element 420 comprises buttons 426a and 426b for controlling the degree of support in the selected position. In particular, when pressing the button 426a, the degree of support is decreased in the selected position, and when pressing the button 426b, the degree of support is increased in the selected position. In the following, the corresponding operations will be described in more detail.

When pressing the button 425a so as to move the position of lumbar support in the upward direction, the electronic control unit first checks which of the zones Z1, Z2, Z3, Z4 is most activated by checking which of the actuators A1 and A2 is further away from its neutral position, in which there is no significant tension on each of the Bowden cable arrangements. Then it is checked which of the zones controlled by this actuator is more activated. The activation amplitude is stored. After these preparations, the most activated zone is deactivated and the next zone in the upward direction is activated with the stored activation amplitude. This process is continued as long as the button 425a is pressed, until the highest zone, i.e. the fourth zone Z4, is reached. If the highest zone was already the most activated zone at the beginning of the process, no action is to be performed.

When pushing the button 425b, it is first checked which of the zones Z1, Z2, Z3, Z4 is most activated by checking which of the actuators A1, A2 is further away from its neutral position. Then it is checked which of the zones controlled by this actuator is most activated and the activation amplitude is stored. After these preparations, the most activated zone is deactivated and the next zone in the downward direction is activated with the stored activation amplitude. This process is continued as long as the button 425b is pressed, until the lowest zone, i.e. the first zone Z1, is reached. If the lowest zone was already the most activated zone at the beginning of the process, no action is to be performed.

When pressing the button 426a so as to decrease the degree of lumbar support at the selected position, both actuators A1 and A2 are controlled toward their neutral position.

When pressing the button 426b so as to increase the degree of lumbar support at the selected position, it is first checked which of the zones Z1, Z2, Z3, Z4 is most activated by checking which of the actuators A1 and A2 is further away from its neutral position. Then it is checked which of the zones controlled by this actuator is most activated. After these preparations, the degree of support is increased by controlling this actuator further away from its neutral position and by controlling the other actuator toward its neutral position.

Figure 26A:
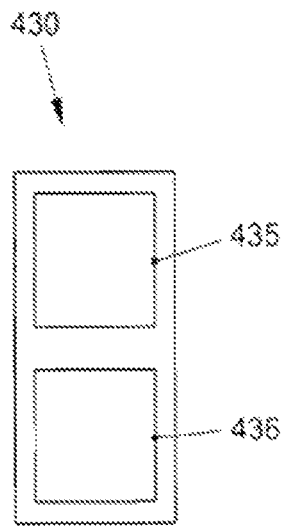
FIGS. 26(A) and (B) schematically illustrate the operating principles of the support assembly of FIG. 24 with respect to massage functions.
Figure 26B:
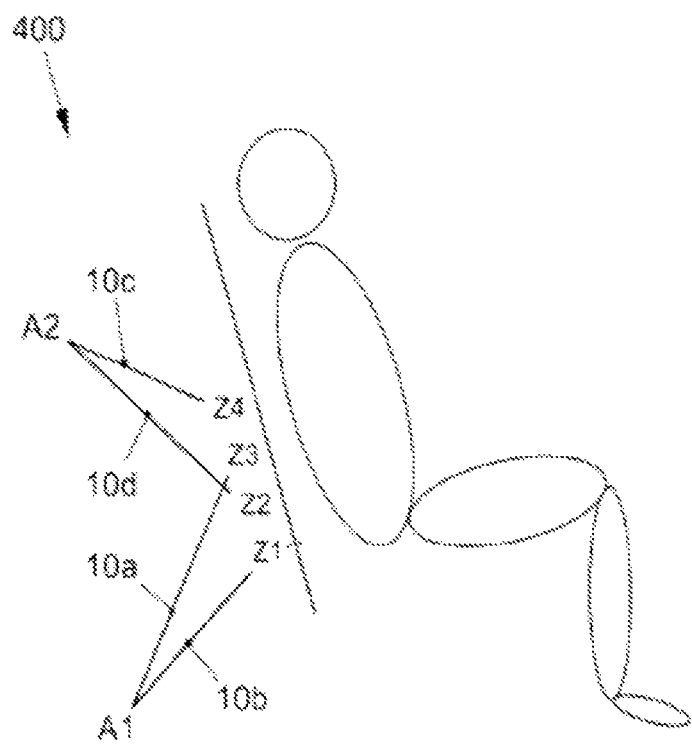
Figure 28:
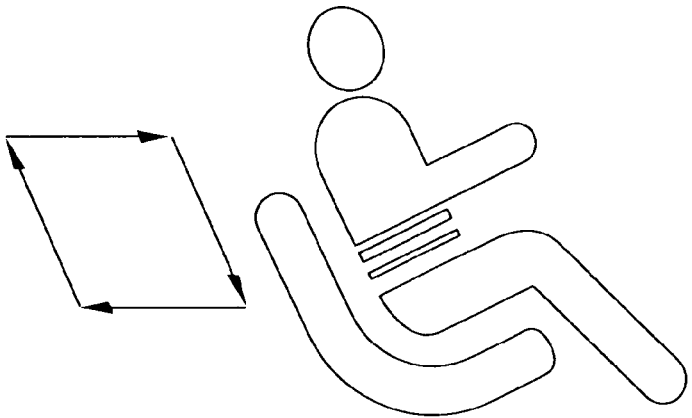
Figure 29:
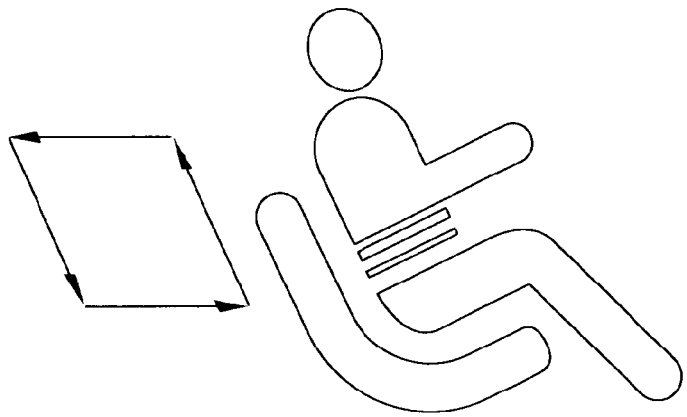

FIG. 26 schematically illustrates the support assembly 400 and a further control element 430 for controlling massage functions of the support assembly 400. The control element 430 comprises buttons 435 and 436. When pressing the button 435, a massage function is activated, and by repressing the button 435 in the activated state of the massage function, a massage mode or massage pattern may be selected. By pressing the button 436, the massage function is deactivated. Preferably, the lumbar support device is then controlled to return to its static position before activation of the massage function. The corresponding operations will be described in more detail below by referring to exemplary massage patterns as illustrated in FIGS. 27-29.

Figure 27:
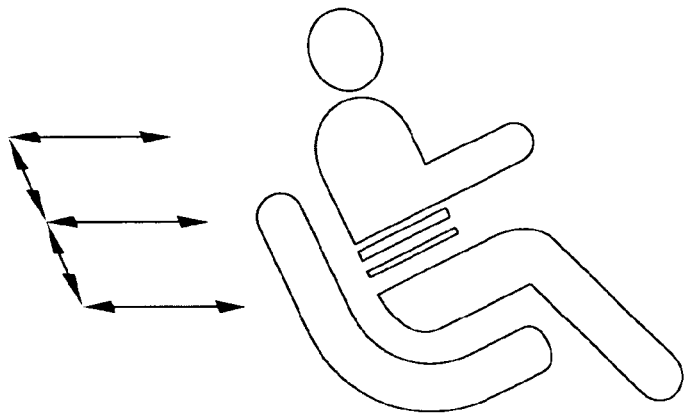
FIGS. 27, 28, and 29 illustrate exemplary massage patterns according to embodiments of the present invention.

A first exemplary massage pattern as illustrated in FIG. 27 corresponds to a wave pattern. The table of FIG. 27 shows a sequence of steps for controlling the actuators A1 and A2. In the table, the neutral position of an actuator is designated by 50%. Correspondingly, a full activation of one of the Bowden cable arrangements is designated by 100%, and a full activation of the other Bowden cable arrangement is designated by 0%.

In step 1 of the pattern of FIG. 27, the lumbar support assembly is moved to its neutral position by controlling both actuators A1 and A2 to their neutral position or to 50%. In the second step, the first zone Z1 is activated by controlling the actuator A1 to 0%. The second actuator A2 remains at 50%. In step 3, the first zone Z1 is deactivated by controlling the first actuator A1 to 50%. The second actuator A2 remains at 50%. In step 4, the second zone Z2 is activated by controlling the second actuator A2 to 0%. The first actuator A1 remains at 50%. In step 5, the second zone Z2 is deactivated by controlling the second actuator A2 to 50%. The first actuator A1 remains at 50%. In step 6, the third zone Z3 is activated by controlling the first actuator A1 to 100%. The second actuator A2 remains at 50%. In step 7, the third zone Z3 is deactivated by controlling the first actuator A1 to 50%. The second actuator A2 remains at 50%. In step 8, the fourth zone Z4 is activated by controlling the second actuator A2 to 100%. The first actuator A1 remains at 50%. In step 9, the fourth zone Z4 is deactivated by controlling the second actuator A2 to 50%.

Then, in step 10, steps 2 to 9 are repeated, e.g. ten times. In step 11, the lumbar support assembly is controlled to go back to its original position.

The massage mode of FIG. 27 changes the degree of support over the different zones in a wave pattern, which was found to create a wellness feeling by micro-movement of the spine of a seat occupant.

FIG. 28 schematically illustrates a second exemplary massage pattern which corresponds to a downward-moving massage pattern.

In step 1, the support assembly is controlled to go to its neutral position by controlling both actuators A1 and A2 to 50%. In step 2, the fourth zone Z4 is activated by controlling the second actuator A2 to 100%. The first actuator A1 remains at 50%. In step 3, the third zone Z3 is activated by controlling the first actuator A1 to 100%. The second actuator A2 remains at 100%. In step 4, the fourth zone Z4 is deactivated by controlling the second actuator A2 to 50%. The first actuator A1 remains at 100%. In step 5, the second zone Z2 is activated by controlling the second actuator A2 to 0%. The first actuator A1 remains at 100%. In step 6, the third zone Z3 is deactivated by controlling the first actuator A1 to 50%. The second actuator A2 remains at 0%. In step 7, the first zone Z1 is activated by controlling the first actuator A1 to 0%. The second actuator A2 remains at 0%. In step 8, the second zone Z2 is deactivated by controlling the second actuator A2 to 50%. The first actuator A1 remains at 0%. In step 9, the fourth zone Z4 is activated by controlling the second actuator A2 to 100%. The first actuator A1 remains at 0%. In step 10, the first zone Z1 is deactivated by controlling the first actuator A1 to 50%. The second actuator A2 remains at 100%.

In step 11, steps 3 to 6 are repeated, e.g. 10 times. In step 12, the support assembly is controlled back to its original position.

The downward-moving massage pattern was found to create a relaxing effect for a seat occupant.

In FIG. 29, a third exemplary massage pattern is illustrated, which corresponds to an upward-moving massage pattern.

In step 1, the support assembly is controlled to go into its neutral position by controlling both actuators A1 and A2 to 50%. In step 2, the first zone Z1 is activated by controlling the first actuator A1 to 0%. The second actuator A2 remains at 50%. In step 3, the second zone Z2 is activated by controlling the second actuator A2 to 0%. The first actuator A1 remains at 0%. In step 4, the first zone Z1 is deactivated by controlling the first actuator A1 to 50%. The second actuator A2 remains at 0%. In step 5, the third zone Z3 is activated by controlling the first actuator A1 to 100%. The second actuator A2 remains at 0%. In step 6, the second zone Z2 is deactivated by controlling the second actuator A2 to 50%. The first actuator A1 remains at 100%. In step 7, the fourth zone Z4 is activated by controlling the second actuator A2 to 100%. The first actuator A1 remains at 100%. In step 8, the third zone Z3 is deactivated by controlling the first actuator A1 to 50%. The second actuator A2 remains at 100%. In step 9, the first zone Z1 is activated by controlling the first actuator A1 to 0%. The second actuator A2 remains at 100%. In step 10, the fourth zone Z4 is deactivated by controlling the second actuator A2 to 50%. The first actuator A1 remains at 0%.

In step 11, steps 3 to 10 are repeated, e.g. ten times. In step 12, the support assembly is controlled to go back to its original position.

The upward-moving massage pattern was found to have a stimulating effect for a seat occupant.

It is to be understood that the above described massage patterns are merely exemplary and may be modified or combined with each other so as to obtain different or more complicated massage patterns. Further, it is also possible to modify the massage amplitudes for one or for all of the massage steps. In this case, the actuators would be controlled in such a way that the corresponding zones are not fully activated, but only up to a desired maximum value. Further, different massage patterns may also be obtained by controlling the timings of the steps and the cycle speed.

FIGS. 30(A) and (B) schematically illustrate a support assembly 500 according to a further embodiment of the invention. In this case, an adjustment arrangement is provided which is based on a lever member 550. A support member 520 of the support assembly 500 may be a flexible shield or plate or the like.

As illustrated, the lever member 550 comprises a first arm 550a and a second arm 550b. The first arm 550a acts on the support member 520 in a first support region, and the second arm 550b acts on the support member 520 in a second support region. For example, the arms 550a, 550b may each push against an elastic force arising from the elastic properties of the support member 520, thereby causing the support member 520 to deform.

The lever member 550 comprises a rotation axis 555 which is coupled to an actuator, e.g. an electric motor. By rotating the lever member 550 about the rotation axis 555, the forces acting on the support member 520 in one of the support regions increase, whereas the forces acting on the support member 520 in the other support region decrease. This is illustrated by FIGS. 30(A) and (B). In FIG. 30(A), the forces generated by the first arm 550a of the lever member 550 are smaller than the forces generated by the second arm 550b of the lever member 550, thereby obtaining an increased support in the second support region. As compared to that, in the situation of FIG. 30B), the forces generated by the first arm 550a of the lever member 550 are larger than the forces generated by the second arm 550b of the lever member 550, thereby obtaining an increased support in the first support region. The corresponding rotation movements of the lever member 550 are illustrated by the arrows in FIGS. 30(A) and (B).

As appropriate, the support assembly of FIG. 30 may be used on its own or in connection with the above-described concepts, e.g. if it is desired to replace a Bowden cable arrangement by a different type of adjustment mechanism.

Accordingly, the support assemblies as described above allow for adjusting the degree of support in two different regions of a support assembly by means of a single actuator. Thereby, it is possible not only to adjust the degree of support in each of the regions, but also to select different heights for the support. The specific preferences with respect to the profile of the support can be met in a more accurate way. Further, it is possible to adapt the support assembly to differently sized users. At the same time, the structure of the support assembly is kept simple and only few components are required for the implementation.

The invention claimed is:

1. A support assembly having a first support region with adjustable degree of support and a second support region with adjustable degree of support, comprising:
   a support member to be incorporated into a seat frame;
   a first Bowden cable arrangement to adjust the degree of support in the first support region;
   a second Bowden cable arrangement to adjust the degree of support in the second support region;
   a first actuator coupled to the first Bowden cable arrangement and to the second Bowden cable arrangement, wherein the first actuator is configured to simultaneously act on the first Bowden cable arrangement in a first direction that increases tension in the first Bowden cable arrangement and on the second Bowden cable arrangement in a second direction that decreases tension in the second Bowden cable arrangement; and
   a wire-length control mechanism coupled to one of the first Bowden cable arrangement and the second Bowden cable arrangement, wherein the wire-length control mechanism is configured to absorb an excessive length of a wire of the one of the first Bowden cable arrangement and the second Bowden cable arrangement,
   wherein the wire-length control mechanism comprises a slide member which is slidably coupled to a fixed member,
   wherein the wire of the one of the first Bowden cable arrangement and the second Bowden cable arrangement is slidably coupled to the slide member, and
   wherein a sliding movement of the wire with respect to the slide member is limited in one direction by a stop member.

2. The support assembly according to claim 1,
   wherein the wire of the one of the first Bowden cable arrangement and the second Bowden cable arrangement comprises a first portion and a second portion which are separated from each other,
   wherein the first portion of the wire is coupled to the actuator and slidably coupled to the slide member,
   wherein the second portion of the wire is coupled to the slide member, and
   wherein the sliding movement of the first portion of the wire with respect to the slide member is limited by the stop member.

3. The support assembly according to claim 1,
   wherein the sliding movement of the stop member with respect to the fixed member is limited in at least one direction by an abutment.

4. The support assembly according to claim 1,
   wherein the wire-length control mechanism is implemented within the first actuator.

5. The support assembly according to claim 1,
   wherein the first Bowden cable arrangement and the second Bowden cable arrangement each comprise a wire guided in a sheath and a cable-splitting member configured to tension in the wire to a further wire,
   wherein the cable-splitting member comprises a further fixed member to which a first portion of the sheath is connected, and a further slide member which is slidably coupled to the fixed member and to which a second portion of the sheath is connected, the wire of each respective Bowden cable arrangement extending through the first portion of the sheath, through the cable-splitting member and through the second portion of the sheath, and
   wherein the further wire is connected to the further slide member.

6. The support assembly according to claim 5,
   wherein the fixed member of the cable-splitting member comprises a clip portion for attaching the cable-splitting member to the support member.

7. The support assembly according to claim 1, comprising:
   a first connecting structure for connecting a first end portion of the wire of the first Bowden cable arrangement to the seat frame and a second connecting structure for connecting a first end portion of the wire of the second Bowden cable arrangement to the seat frame, wherein each of the connecting structures comprises a plastic member configured to be attached to the seat frame.

8. The support assembly according to claim 7,
   wherein the plastic member comprises a guide channel for guiding the wire along an outer surface of the plastic member.

9. The support assembly according to claim 8,
   wherein the guide channel has a tapering shape.

10. The support assembly according to claim 1,
    wherein the first actuator is attached to the support member.

11. The support assembly according to claim 10,
    wherein the first actuator is attached to the support member near one side of the support member.

12. The support assembly according to claim 11,
    wherein at least one of the first Bowden cable arrangement and the second Bowden cable arrangement comprises an unsheathed wire extending from the actuator on said one side of the support assembly.

13. The support assembly according to claim 1,
    wherein a routing of the first Bowden cable arrangement and of the second Bowden cable arrangement provides a substantially uniform curvature of sheathed portions of the Bowden cable arrangements.

14. The support assembly according to claim 1, comprising:
    a third Bowden cable arrangement to adjust the degree of support in a third support region,
    a fourth Bowden cable arrangement to adjust the degree of support in a fourth support region, and
    a second actuator coupled to the third Bowden cable arrangement and to the fourth Bowden cable arrangement,
    wherein the second actuator is configured to simultaneously act on the third Bowden cable arrangement and on the fourth Bowden cable arrangement in opposite directions.

15. The support assembly according to claim 14, comprising:
    a further wire-length control mechanism coupled to one of the third Bowden cable arrangement and the fourth Bowden cable arrangement, wherein the wire-length control mechanism is configured to absorb an excessive length of a wire of the one of the third Bowden cable arrangement and the fourth Bowden cable arrangement.

16. The support assembly according to claim 15,
    wherein the further wire-length control mechanism is implemented within the second actuator.

17. The support assembly according to claim 14,
    wherein the fourth support region is located between the first support region and the second support region, and the first support region is located between the third support region and the fourth support region.

18. The support assembly according to claim 14,
    wherein the first actuator and second actuator each comprise an electric motor to drive the actuator, wherein the support assembly comprises a controller to electronically control operation of the electric motors, and wherein the controller is configured to control operation of the electric motors in a cyclic manner so as to provide a massage function through the support element.

19. The support assembly according to claim 18, wherein the massage function changes the degree of support over the support regions in a wave pattern, in a downward-moving pattern or in an upward-moving pattern.

20. A support assembly having a first support region with adjustable degree of support and a second support region with adjustable degree of support, comprising:

a support member to be incorporated into a seat frame;

a first adjustment arrangement to adjust the degree of support in the first support region;

a second adjustment arrangement to adjust the degree of support in the second support region;

a first actuator coupled to the first adjustment arrangement and to the second adjustment arrangement, wherein the first actuator is configured to simultaneously act on the first adjustment arrangement in a first direction that increases tension in the first adjustment arrangement and on the second adjustment arrangement in a second direction that decreases tension in the second adjustment arrangement, wherein the actuator is attached to the support member; and a wire-length control mechanism coupled to one of the first adjustment arrangement and the second adjustment arrangement, wherein the wire-length control mechanism is configured to absorb an excessive length of a wire of the one of the first adjustment arrangement and the second adjustment arrangement, wherein the wire-length control mechanism comprises a slide member which is slidably coupled to a fixed member, wherein the wire of the one of the first adjustment arrangement and the second adjustment arrangement is slidably coupled to the slide member, and wherein a sliding movement of the wire with respect to the slide member is limited in one direction by a stop member.

21. The support assembly according to claim 20, wherein the first adjustment arrangement and the second adjustment arrangement each comprise a Bowden cable arrangement.

22. The support assembly according to claim 21, wherein a routing of the Bowden cable arrangements of the first adjustment arrangement and of the second adjustment arrangement provides a substantially uniform curvature of sheathed portions of the Bowden cable arrangement of the first adjustment arrangement and of the second adjustment arrangement.

23. The support assembly according to claim 21, wherein the actuator is attached to the support member at one side thereof.

24. The support assembly according to claim 23, wherein at least one of the first Bowden cable arrangement and the second Bowden cable arrangement comprises an unsheathed wire extending from the actuator on said one side of the support assembly.

25. The support assembly according to claim 20, wherein the first adjustment arrangement and the second adjustment arrangement each comprise an unsheathed wire arrangement.

26. A support assembly having a first support region with adjustable degree of support, a second support region with adjustable degree of support, a third support region with adjustable degree of support, and a fourth support region with adjustable degree of support, comprising:

a support member to be incorporated into a seat frame;

a first adjustment arrangement to adjust the degree of support in the first support region;

a second adjustment arrangement to adjust the degree of support in the second support region;

a third adjustment arrangement to adjust the degree of support in the third support region;

a fourth adjustment arrangement to adjust the degree of support in the fourth support region;

a first actuator coupled to the first adjustment arrangement and to the second adjustment arrangement, wherein the first actuator is configured to simultaneously act on the first adjustment arrangement in a first direction that increases tension in the first adjustment arrangement and on the second adjustment arrangement in a second direction that decreases tension in the second adjustment arrangement;

a second actuator coupled to the third adjustment arrangement and to the fourth adjustment arrangement, wherein the second actuator is configured to simultaneously act on the third adjustment arrangement and on the fourth adjustment arrangement in opposite directions; and a wire-length control mechanism coupled to one of the first adjustment arrangement and the second adjustment arrangement, wherein the wire-length control mechanism is configured to absorb an excessive length of a wire of the one of the first adjustment arrangement and the second adjustment arrangement, wherein the wire-length control mechanism comprises a slide member which is slidably coupled to a fixed member, wherein the wire of the one of the first adjustment arrangement and the second adjustment arrangement is slidably coupled to the slide member, and wherein a sliding movement of the wire with respect to the slide member is limited in one direction by a stop member.

27. The support assembly according to claim 26, wherein the fourth support region is located between the first support region and the second support region, and the first support region is located between the third support region and the fourth support region.

28. The support assembly according to claim 26, wherein the first actuator and second actuator each comprise an electric motor to drive the actuator, wherein the support assembly comprises a controller to electronically control operation of the electric motors, and wherein the controller is configured to control operation of the electric motors in a cyclic manner so as to provide a massage function through the support element.

29. The support assembly according to claim 28, wherein the massage function changes the degree of support over the support regions in a wave pattern, in a downward moving pattern or in an upward moving pattern.

30. The support assembly according to claim 26, wherein the first actuator and the second actuator are attached to the support element.

31. The support assembly according to claim 30, wherein the first actuator and the second actuator are attached to the support element at opposite sides thereof.

32. The support assembly according to claim 26,
wherein the first adjustment arrangement and the second adjustment arrangement each comprise a Bowden cable arrangement.

33. The support assembly according to claim 32,
wherein a routing of the Bowden cable arrangements in the first adjustment arrangement, the second adjustment arrangement, the third adjustment arrangement, and the fourth adjustment arrangement provides a substantially uniform curvature of sheathed portions of the Bowden cable arrangements.

34. A support assembly having a first support region with adjustable degree of support and a second support region with adjustable degree of support, comprising:
   a support member to be incorporated into a seat frame;
   a first Bowden cable arrangement to adjust the degree of support in the first support region;
   a second Bowden cable arrangement to adjust the degree of support in the second support region;
   a first actuator coupled to the first Bowden cable arrangement and to the second Bowden cable arrangement, wherein the first actuator is configured to simultaneously act on the first Bowden cable arrangement in a first direction that increases tension in the first Bowden cable arrangement and on the second Bowden cable arrangement in a second direction that decreases tension in the second Bowden cable arrangement; and
   a wire-length control mechanism coupled to one of the first Bowden cable arrangement and the second Bowden cable arrangement, wherein the wire-length control mechanism is configured to absorb an excessive length of a wire of the one of the first Bowden cable arrangement and the second Bowden cable arrangement,
   wherein the wire-length control mechanism comprises a jacket through which the wire of the one of the first Bowden cable arrangement and the second Bowden cable arrangement is guided,
   wherein the one of the first Bowden cable arrangement and the second Bowden cable arrangement includes a wire sheath separated into a two portions, wherein a first portion of the sheath is fixed to one end of the jacket and a second portion of the sheath is slidably received within the jacket, and
   wherein an elastic member is provided between the second portion of the sheath and the jacket so as to bias the second portion of the sheath away from the first portion of the sheath.

\* \* \* \* \*